(12) United States Patent
Suzuki et al.

(10) Patent No.: US 8,402,365 B2
(45) Date of Patent: Mar. 19, 2013

(54) INFORMATION PROCESSING METHOD AND APPARATUS

(75) Inventors: Masaru Suzuki, Kawasaki (JP); Yasuto Ishitani, Matsudo (JP); Ken Ueno, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 529 days.

(21) Appl. No.: 11/211,744

(22) Filed: Aug. 26, 2005

(65) Prior Publication Data

US 2006/0080276 A1 Apr. 13, 2006

(30) Foreign Application Priority Data

Aug. 30, 2004 (JP) ................................. 2004-250249

(51) Int. Cl.
*G06F 17/00* (2006.01)
*G06F 17/30* (2006.01)
(52) U.S. Cl. ............ 715/232; 715/231; 706/48; 706/61; 707/794; 707/803; 707/805
(58) Field of Classification Search .................. 707/1–3, 707/6–7, 100, 102, 104.1, 200, 609, 705–709, 707/748, 750–754, 758, 790–794, 803–805; 704/8–10; 715/230–234, 809, 751, 229, 715/237; 706/45–50, 61
See application file for complete search history.

(56) References Cited

U.S. PATENT DOCUMENTS

| | | | | |
|---|---|---|---|---|
| 6,571,295 B1 * | 5/2003 | Sidana | ........................... | 709/246 |
| 6,629,107 B1 * | 9/2003 | Ouchi et al. | ............... | 707/104.1 |
| 6,918,082 B1 * | 7/2005 | Gross et al. | ................... | 715/206 |
| 2001/0049671 A1 * | 12/2001 | Joerg | .............................. | 706/50 |
| 2003/0126136 A1 * | 7/2003 | Omoigui | ......................... | 707/10 |
| 2003/0196164 A1 * | 10/2003 | Gupta et al. | ............... | 715/500.1 |
| 2003/0204490 A1 * | 10/2003 | Kasriel | .............................. | 707/2 |
| 2004/0205542 A1 * | 10/2004 | Bargeron et al. | ............. | 715/512 |

(Continued)

FOREIGN PATENT DOCUMENTS

| | | |
|---|---|---|
| JP | 5-181857 | 7/1993 |
| JP | 6-242882 | 9/1994 |

(Continued)

OTHER PUBLICATIONS

Atanas Kiryakov et al. "Semantic annotation, indexing, and retrieval", Web Semantics: Science, Services and Agents on the World Wide Web 2 (2004) 49-7.*

(Continued)

*Primary Examiner* — Srirama Channavajjala
(74) *Attorney, Agent, or Firm* — Finnegan, Henderson, Farabow, Garrett & Dunner, L.L.P.

(57) ABSTRACT

An information processing apparatus includes an input unit configured to input an annotation of at least one of an underline, a box, a character, a character string, a symbol and a symbol string to a displayed document, an annotation recognition unit configured to recognize a type of the annotation and a coverage of the annotation in the document, an intention estimation unit configured to estimate intention of a user based on the type of the annotation and information in the coverage, an action storage unit configured to store a plurality of actions, an action selection unit configured to select an action to be performed for the document from the action storage based on the intention estimated by the intention estimation unit, and an execution unit configured to execute the action selected by the action selection unit.

10 Claims, 44 Drawing Sheets

U.S. PATENT DOCUMENTS

| | | | |
|---|---|---|---|
| 2004/0220797 A1* | 11/2004 | Wang et al. ......................... | 704/9 |
| 2004/0243554 A1* | 12/2004 | Broder et al. ...................... | 707/3 |
| 2004/0261016 A1* | 12/2004 | Glass et al. ..................... | 715/512 |
| 2005/0055628 A1* | 3/2005 | Chen et al. ..................... | 715/512 |
| 2006/0100995 A1* | 5/2006 | Albornoz et al. .................. | 707/3 |

FOREIGN PATENT DOCUMENTS

| | | |
|---|---|---|
| JP | 6-324798 | 11/1994 |
| JP | 07-078053 | 3/1995 |
| JP | 08-016312 | 1/1996 |
| JP | 10-149410 | 6/1998 |
| JP | 11-144024 | 5/1999 |
| JP | 2000-010981 | 1/2000 |

OTHER PUBLICATIONS

Japanese Patent Office, Notification of Reasons for Rejection dated Oct. 9, 2007, in Japanese Patent Application No. 2004-250249, 2 pp.

Y. Ichimura et al., "A Study of the Relations among Question Answering, Japanese Named Entity Extraction, and named Entity Taxonomy," IPSJ SIG Technical Report (May 13, 2004), 2004-NL-161:17-24.

L. Wall et al., "Programming Perl," O'Reilly (1997), pp. 66-74.

* cited by examiner

```
<html>
<head>
<title>Press release</title>
</head>
<body>
 . . .
<P>
TSB Co., Ltd. will commercialize "GB G21", Which is improved in usability such as making it possible to transfer the whole folder to a player by storing music data in a mass in the folder set on a personal computer, as a new Product of a digital audio player and release it on April 9.
<P>
A 20GB hard disk of recording medium can save audio data of about 500 music compact discs or about 5,000 pieces of music. Continuous playback is available for about 11 hours with a lithium ion battery built in the player in spite of a small and lightweight body.
 . . .
</body>
</html>
```

F I G. 2

301:
```
<semantic class analysis
knowledge>
<pattern>
([A-Z]+Co\. Ltd\.)
</pattern>
<semantic class>
COMPANY
</semantic class>
</semantic class analysis
knowledge>
```

302:
```
<semantic class analysis
knowledge>
<pattern>
([0-9,]+[GM]B)
</pattern>
<semantic class>
CAPACITY
</semantic class>
</semantic class analysis
knowledge>
```

303:
```
<semantic class analysis
knowledge>
<pattern>
([0-9,]+[giga byte])
</pattern>
<semantic class>
CAPACITY
</semantic class>
</semantic class analysis
knowledge>
```

304:
```
<semantic class analysis
knowledge>
<pattern>
(1?[0-9]mo\.[1-3]?[0-9]day)
</pattern>
<semantic class>
DATE
</semantic class>
</semantic class analysis
knowledge>
```

305:
```
<semantic class analysis
knowledge>
<pattern>
(1?[0-9]/[1-3]?[0-9])
</pattern>
<semantic class>
DATE
</semantic class>
</semantic class analysis
knowledge>
```

306:
```
<semantic class analysis
knowledge>
<pattern>
(「」+」)
</pattern>
<semantic class>
TITLE
</semantic class>
</semantic class analysis
knowledge>
```

307:
```
<semantic class analysis
knowledge>
<pattern>
([0-9,]+[pieces])
</pattern>
<semantic class>
COUNT
</semantic class>
</semantic class analysis
knowledge>
```

308:
```
<semantic class analysis
knowledge>
<pattern>
([0-9,]+time)
</pattern>
<semantic class>
DURATION
</semantic class>
</semantic class analysis
knowledge>
```

FIG. 3

```
<html>
<head>
<title>Press release</title>
</head>
<body>
...
<P>
<SPAN class = "COMPANY">TSB</SPAN> Co., Ltd. will commercialize [<SPAN class = "TITLE">GB G21</SPAN>],
which is improved in usability such as making it possible to transfer the whole folder to a player by storing music
data in a mass in the folder set on a personal computer, as a new product of a digital audio player and release
it on <SPAN class = "DATE">April 9</SPAN>.
<P>
A <SPAN class = "CAPACITY">20GB</SPAN> hard disk of recording medium can save audio data of about
<SPAN class = "COUNT">500</SPAN> music compact discs or about <SPAN class = "COUNT">5,000 pieces of
music</SPAN>. Continuous playback is available for about <SPAN class = "DURATION">11 hours</SPAN>
with a lithium ion battery built in the player in spite of a small and lightweight body.
...
</body>
</html>
```

F I G. 5

```
<html>
<head>
<title>Press release</title>
</head>
<body>
...
<P>
<SPAN class ="COMPANY">TSB</SPAN> Co., Ltd. will commercialize 「<SPAN class ="TITLE">GB G21</SPAN>」,
Which is improved in usability such as making it possible to transfer the whole folder by storing music
data in a mass in the folder set on a personal computer, as a new product of a digital audio player and release
it on <ANNOTATION startX ="101" startY ="52" endX ="123" endY ="54" length ="26"><SPAN class = "DATE">April 9
</SPAN></ANNOTATION>.
<P>
A <SPAN class = "CAPACITY">20GB</SPAN>hard disk of recording medium can save audio data of about
<SPAN class = "COUNT">500</SPAN>, music compact discs or about <SPAN class ="COUNT">5,000 pieces of
music</SPAN>. Continuous playback is available for about <SPAN class = "DURATION">11 hours</SPAN>
with a lithium ion battery built in the player in spite of a small and lightweight body.
...
</body>
</html>
```

F I G. 10

```
<html>
<head>
<title>Press release</title>
</head>
<body>
 . .
<P>
<SPAN class="COMPANY">TSB</SPAN> Co., Ltd. will commercialize [<SPAN class="TITLE">GB G21</SPAN>],
Which is improved in usability such as making it possible to transfer the whole folder to a player by storing music
data in a mass in the folder set on a personal computer, as a new product of a digital audio player and release
it on <SPAN class="DATE">April 9
</SPAN>.
<P>
A <SPAN class="CAPACITY">20GB</SPAN>hard disk of <ANNOTATION startX="14" startY="43" endX="14"
endY="42" length="221"> recording medium can save audio data of about <SPAN class="COUNT">500</SPAN>,
music compact discs or about <SPAN class="COUNT">5,000 pieces of music</SPAN>. Continuous playback is
available for about <SPAN class="DURATION">11 hours</SPAN> with a lithium ion battery built in the player in
spite of a small and lightweight body.</ANNOTATION>
 . .
</body>
</html>
```

FIG. 11

```
<html>
<head>
<title>Press release</title>
</head>
<body>
...
<P>
<SPAN class ="COMPANY">TSB</SPAN> Co., Ltd. will commercialize [<SPAN class ="TITLE">GB G21</SPAN>],
Which is improved in usability such as making it possible to transfer the whole folder to a player by storing music
data in a mass in the folder set on a personal computer, as a new product of a digital audio player and release
it on [<ANNOTATION startX ="24" startY ="62" endX ="25" endY ="51" length ="24"><SPAN class ="DATE">April 9
</SPAN></ANNOTATION>.
<P>
A <SPAN class ="CAPACITY">20GB</SPAN>hard disk of recording medium can save audio data of about
<SPAN class ="COUNT">500</SPAN>, music compact discs or about <SPAN class ="COUNT">5,000 pieces of
music</SPAN>. Continuous playback is available for about <SPAN class ="DURATION">11 hours</SPAN>
with a lithium ion battery built in the player in spite of a small and lightweight body.
...
</body>
</html>
```

F I G. 12

```
<html>
<head>
<title>Press release</title>
</head>
<body>
・・・
<P>
<SPAN class ="COMPANY">TSB</SPAN> Co., Ltd. will commercialize [<SPAN class ="TITLE">GB G21</SPAN>],
Which is improved in usability such as making it possible to transfer the whole folder to a player by storing music
data in a mass in the folder set on a personal computer, as a new product of a digital audio player and release
it on <ANNOTATION type ="underline" startX ="101" startY ="52" endX ="123" endY ="54" length ="26"><SPAN class
="DATE">April 9</SPAN></ANNOTATION>.
<P>
A <SPAN class ="CAPACITY">20GB</SPAN>hard disk of recording medium can save audio data of about
<SPAN class ="COUNT">500</SPAN>, music compact discs or about <SPAN class ="COUNT">5,000 pieces of
music</SPAN>. Continuous playback is available for about <SPAN class ="DURATION">11 hours</SPAN>
with a lithium ion battery built in the player in spite of a small and lightweight body.
・・・
</body>
</html>
```

F I G. 14

```
<html>
<head>
<title>Press release</title>
</head>
<body>
...
<P>
<SPAN class = "COMPANY">TSB</SPAN> Co., Ltd. will commercialize [<SPAN class = "TITLE">GB G21</SPAN>],
Which is improved in usability such as making it possible to transfer the whole folder to a player by storing music
data in a mass in the folder set on a personal computer, as a new product of a digital audio player and release
it on <SPAN class = "DATE">April 9
</SPAN>.
<P>
A <SPAN class = "CAPACITY">20GB</SPAN>hard disk of <ANNOTATION type ="box" startX ="14" startY ="43"
endX ="14" endY ="42" length ="221"> recording medium can save audio data of about <SPAN class ="COUNT">
500</SPAN>, music compact discs or about <SPAN class = "COUNT">5,000 pieces of music</SPAN>. Continuous
playback is available for about <SPAN class = "DURATION">11 hours</SPAN> with a lithium ion battery built in
the player in spite of a small and lightweight body.</ANNOTATION>
...
</body>
</html>
```

FIG. 15

```
<html>
<head>
<title>Press release</title>
</head>
<body>
 . .
<P>
<SPAN class = "COMPANY">TSB</SPAN> Co., Ltd. will commercialize [<SPAN class = "TITLE">GB G21</SPAN>],
Which is improved in usability such as making it possible to transfer the whole folder to a player by storing music
data in a mass in the folder set on a personal computer, as a new product of a digital audio player and release
it on <ANNOTATION type ="note" value ="?" startX ="24" startY ="62" endX ="25" endY ="51" length ="24">
<SPAN class = "DATE">April 9</SPAN></ANNOTATION>.
<P>
A <SPAN class = "CAPACITY">20GB</SPAN>hard disk of recording medium can save audio data of about
<SPAN class = "COUNT">500</SPAN>, music compact discs or about <SPAN class = "COUNT">5,000 pieces of
music</SPAN>. Continuous playback is available for about <SPAN class = "DURATION">11 hours</SPAN>
with a lithium ion battery built in the player in spite of a small and lightweight body.
 . .
</body>
</html>
```

F I G. 16

```
<html>
<head>
<title>Press release</title>
</head>
<body>
・・<P>
<SPAN class ="COMPANY">TSB</SPAN> Co., Ltd. will commercialize 「<SPAN class ="TITLE">GB G21</SPAN>」,
which is improved in usability such as making it possible to transfer the whole folder to a player by storing music
data in a mass in the folder set on a personal computer, as a new product of a digital audio player and release
it on <ANNOTATION type ="underline" INTENTION ="schedule addition" startX ="101" startY ="52" endX ="123"
endY ="54" length ="26"><SPAN class ="DATE">April 9</SPAN></ANNOTATION>.
</P>
A <SPAN class ="CAPACITY">20GB</SPAN>hard disk of recording medium can save audio data of about
<SPAN class ="COUNT">500</SPAN>, music compact discs or about <SPAN class ="COUNT">5,000 pieces of
music</SPAN>. Continuous playback is available for about <SPAN class ="DURATION">11 hours</SPAN>
with a lithium ion battery built in the player in spite of a small and lightweight body.
・・
</body>
</html>
```

F I G. 19

```
<html>
<head>
<title>Press release</title>
</head>
<body>
 . . .
<P>
<SPAN class = "COMPANY">TSB</SPAN> Co., Ltd. will commercialize [<SPAN class = "TITLE">GB G21</SPAN>],
Which is improved in usability such as making it possible to transfer the whole folder to a player by storing music
data in a mass in the folder set on a personal computer, as a new product of a digital audio player and release
it on <SPAN class = "DATE">April 9
</SPAN>.
<P>
A <SPAN class = "CAPACITY">20GB</SPAN>hard disk of <ANNOTATION type ="box" INTENTION ="database
addition" startX ="14" startY ="43" endX ="14" endY ="42" length ="221"> recording medium can save audio data of
about <SPAN class = "COUNT">500</SPAN>, music compact discs or about <SPAN class = "COUNT">5,000 pieces
of music</SPAN>. Continuous playback is available for about <SPAN class = "DURATION">11 hours</SPAN> with
a lithium ion battery built in the player in spite of a small and lightweight body.</ANNOTATION>
 . . .
</body>
</html>
```

FIG. 20

```
<html>
<head>
<title>Press release</title>
</head>
<body>
. . .
<P>
<SPAN class="COMPANY">TSB</SPAN> Co., Ltd. will commercialize「<SPAN class="TITLE">GB G21</SPAN>」,
Which is improved in usability such as making it possible to transfer the whole folder to a player by storing music
data in a mass in the folder set on a personal computer, as a new product of a digital audio player and release
it on「<ANNOTATION type="note" INTENTION="search" value="?" startX="24" startY="62" endX="25"
endY="51" length="24"><SPAN class="DATE">April 9</SPAN></ANNOTATION>.
<P>
A <SPAN class="CAPACITY">20GB</SPAN>hard disk of recording medium can save audio data of about
<SPAN class="COUNT">500</SPAN>, music compact discs or about <SPAN class="COUNT">5,000 pieces of
music</SPAN>. Continuous playback is available for about <SPAN class="DURATION">11 hours</SPAN>
with a lithium ion battery built in the player in spite of a small and lightweight body.
. . .
</body>
</html>
```

F I G. 21

TITLE : ARTICLE PROJECT IMBESTIGATION COMMISSION

Mr.Sato, Mr.Saito, Mr.Okada

I am Tanaka in first planning department
I am indebted.

As for article project drafting that talked when met the other day, I would like to open a review meeting according to the following description.

---

Agenda : 2004 year end article projection review meeting
First candidate day : 2004.07.07 13:30-15:30
Second candidate day : 2004.07.08 10:00-12:00
Assignment : Write up individual project concept on a A4 sheet

---

I would therefore like to select convenient date from the above candidate days and send a reply.

Thanks for your help

===
TSB Co. Ltd.
First planning department TARO TANAKA
TEL / FAX : 03-XXXX-1111
E-mail : t-tanaka@tsb.zzz.jp
===

FIG. 24

```
TITLE : <SPAN class ="EMTITLE">  ~ st1
ARTICLE PROJECT IMBESTIGATION COMMISSION
</SPAN>

<SPAN class="TO_NAME">Mr.Sato</SPAN>
<SPAN class="TO_NAME">Mr.Saito</SPAN>    } ~ st2
<SPAN class="TO_NAME">Mr.Okada</SPAN>
                                            st3
I am <SPAN class="SENDER">Tanaka</SPAN> in
<SPAN class="DIV_OR_CO">first planning department</SPAN>
I am indebted                                             st4

As for article project drafting that talked when met the other day, I would
like to open a review meeting according to the following description.
                                                          st5
------------------------------------------------------------
Agenda : <SPAN class ="AGENDA">2004 year end article projection review
meeting</SPAN>
<SPAN class="DATETIME">First candidate day : 2004.07.07 13:30-15:30</SPAN>
<SPAN class="DATETIME">Second candidate day : 2004.07.08 10:00-12:00</SPAN>
<SPAN class="HW">Assignment : Write up individual project concept on a A4 sheet
</SPAN>         st7
                                                          st6
------------------------------------------------------------
I would therefore like to select convenient date from the above candidate
days and send a reply.

Thanks for your help
                    st8
================================================================
                                                          st9
<SPAN class="COMPANY">TSB Co. Ltd. </SPAN>
<SPAN class="DIV_OR_CO">First planning department</SPAN>TARO TANAKA
TEL / FAX : 03-XXXX-1111
E-mail : t-tanaka@tsb.zzz.jp  ~ st10
================================================================
```

FIG. 26

```
<semantic class analysis knowledge>      foreach $line (@astr){
<pattern>                                  if($line =~/Mr\./){
(Mr\. (.*))                                  @nam=split(/[Mr\. ]/g,$line);
</pattern>                                   foreach $nm (@nam){
<semantic class>                               print "$nm," if $nm ne "";
class($1)=TO_NAME                            }
</semantic class>                          }
</semantic class analysis knowledge>     }
```

FIG. 27

Intention estimation knowledge information

```
ANNOTATION_TYPE ="T"
SEMANTIC_CLASS ="TO_NAME | DATETIME"
INTENTION ="making of schedule table"
```

FIG. 30

TITLE : <SPAN class ="EMTITLE">ARTICLE PROJECT IMBESTIGATION COMMISSION</SPAN>

<SPAN class="TO_NAME">Mr.Sato</SPAN>, <SPAN class="TO_NAME">Mr.Saito</SPAN>, <SPAN class ="TO_NAME">Mr.Okada</SPAN>

I am <SPAN class="SENDER">Tanaka</SPAN> in
<SPAN class="DIV_OR_CO">first planning department</SPAN>
I am indebted As for article project drafting that talked when met the other day, I would like to open a review meeting according to the following description.

Agenda : <SPAN class ="AGENDA">2004 year end article projection review meeting</SPAN>
<SPAN class="DATETIME">First candidate day:2004.07.07 13:30-15:30</SPAN>
<SPAN class="DATETIME">Second candidate day:2004.07.08 10:00-12:00</SPAN>
<SPAN class="HW">Assignment : Write up individual project concept on a A4 sheet</SPAN>

I would therefore like to select convenient date from the above candidate days and send a reply.

Thanks for your help

<SPAN class="COMPANY">TSB Co. Ltd. </SPAN>
<SPAN class="DIV_OR_CO">First planning department</SPAN>TARO TANAKA
TEL / FAX : 03-XXXX-1111
E-mail : t-tanaka@tsb.zzz.jp

TITLE : <SPAN class ="EMTITLE">ARTICLE PROJECT IMBESTIGATION COMMISSION</SPAN>
<ANNOTATION type="insertion" value="T" >

<SPAN class="TO_NAME">Mr.Sato</SPAN>, <SPAN class="TO_NAME">Mr.Saito</SPAN>, <SPAN class ="TO_NAME">Mr.Okada</SPAN>

I am <SPAN class="SENDER">Tanaka</SPAN> in
<SPAN class="DIV_OR_CO">first planning department</SPAN>
I am indebted As for article project drafting that talked when met the other day, I would like to open a review meeting according to the following description.

Agenda : <SPAN class ="AGENDA">2004 year end article projection review meeting</SPAN>
<SPAN class="DATETIME">First candidate day : 2004.07.07 13:30-15:30</SPAN>
<SPAN class="DATETIME">Second candidate day : 2004.07.08 10:00-12:00</SPAN>
<SPAN class="HW">Assignment : Write up individual project concept on a A4 sheet</SPAN>

</ANNOTATION>

I would therefore like to select convenient date from the above candidate days and send a reply.

Thanks for your help

<SPAN class="COMPANY">TSB Co. Ltd. </SPAN>
<SPAN class="DIV_OR_CO">First planning department</SPAN>TARO TANAKA
TEL / FAX : 03-XXXX-1111
E-mail : t-tanaka@tsb.zzz.jp

~501

~502

F I G. 29

Schedule table

| DATETIME / NAME | First candidate day and hour: 2004.07.07 13:30-15:30 | Second candidate day and hour: 2004.07.08 10:00-12:00 |
|---|---|---|
| Sato | | |
| Saito | | |
| Okada | | |

F I G. 32

ACTIVE

| DATETIME / NAME | First candidate day and hour 2004.07.07 13:30-15:30 | Second candidate day and hour: 2004.07.08 10:00-12:00 |
|---|---|---|
| Sato | | |
| Saito | | |
| Okada | | |

F I G. 35

TITLE: <SPAN class ="EMTITLE">ARTICLE PROJECT IMBESTIGATION COMMISSION</SPAN>

<SPAN class ="TO_NAME">Mr.Sato</SPAN>, <SPAN class ="TO_NAME">Mr.Saito</SPAN>, <SPAN class ="TO_NAME">Mr.Okada</SPAN>

I am <SPAN class="SENDER">Tanaka</SPAN> in
<SPAN class="DIV_OR_CO">first planning department</SPAN>
I am indebted As for article project drafting that talked when met the other day, I would
like to open a review meeting according to the following description.

Agenda : <SPAN class ="AGENDA">2004 year end article projection review meeting</SPAN>
<SPAN class="DATETIME">First candidate day : 2004.07.07 13:30-15:30</SPAN>
<SPAN class="DATETIME">Second candidate day : 2004.07.08 10:00-12:00</SPAN>
<SPAN class="HW">Assignment: Write up individual project concept on a A4 sheet</SPAN>

I would therefore like to select convenient date from the above candidate days and send a reply.

Thanks for your help

<SPAN class="COMPANY">TSB Co. Ltd. </SPAN>
<SPAN class="DIV_OR_CO">First planning department</SPAN>TARO TANAKA
TEL / FAX : 03-XXXX-1111
E-mail : t-tanaka@tsb.zzz.jp TO_NAME → Row TO_NAME → Column

TITLE : <SPAN class ="EMTITLE">ARTICLE PROJECT IMBESTIGATION COMMISSION</SPAN>
<ANNOTATION type="insertion" value="T" >                                              503

<SPAN class="TO_NAME">Mr.Sato</SPAN>, <SPAN class="TO_NAME">Mr.Saito</SPAN>, <SPAN class    [TO_NAME → Row]
="TO_NAME">Mr.Okada</SPAN>
                                                                                      501
I am <SPAN class="SENDER">Tanaka</SPAN> in                                            [TO_NAME → Column]
<SPAN class="DIV_OR_CO">first planning department</SPAN>
I am indebted As for article project drafting that talked when met the other day, I would
like to open a review meeting according to the following description.

Agenda : <SPAN class="AGENDA">2004 year end article projection review meeting</SPAN>
<SPAN class="DATETIME">First candidate day: 2004.07.07 13:30-15:30</SPAN>       504
<SPAN class="DATETIME">Second candidate day: 2004.07.08 10:00-12:00</SPAN>
<SPAN class="HW">Assignment: Write up individual project concept on a A4 sheet</SPAN>

I would therefore like to select convenient date from the above candidate days and send a reply.

Thanks for your help

<SPAN class="COMPANY">TSB Co. Ltd. </SPAN>
<SPAN class="DIV_OR_CO">First planning department</SPAN>TARO TANAKA
TEL / FAX : 03-XXXX-1111
E-mail : t-tanaka@tsb.zzz.jp

</ANNOTATION>

Return mail

```
TITLE: <SPAN class ="EMTITLE">Re : ARTICLE PROJECT IMBESTIGATION COMMISSION</SPAN>  ~ st11
st12 ~ <SPAN class="SENDER">Mr.Tanaka</SPAN> in <SPAN class="DIV_OR_CO">first planning department</SPAN>  ~ st13

Good day, I am <SPAN class="REPLY SENDER">Sato<SPAN> in  ~ st14
<SPAN class="DIV_OR_CO">second development department</SPAN>  ~ st15

><SPAN class="DATETIME">First candidate day and hour :       ~ st16
><SPAN class="DATETIME">Second candidate day and hour :
(snip)
I would therefore like to select convenient date from the above candidate days
and send a reply.

I am available for a whole day of <SPAN class="PLAN"><SPAN class="DATETIME">second candidate</SPAN>
                                                 ~
                                                 st17                              st16

Thanks for your help

TSB Co. Ltd.
Second development department ICHIRO SATO
TEL / FAX : 03-XXXX-2222
E-mail : isato@tsb.zzz.jp
```

F I G. 36

(a)
```
<semantic class analysis knowledge>
<pattern>
($1 of $2) AND class($1)==DIV_OR_CO, TITLE=~/Re:/
</pattern>
<semantic class>
class($2)=REPLY_SENDER
</semantic class>
</semantic class analysis knowledge>
```
— sk9

(b)
```
<semantic class analysis knowledge>
<pattern>
(Mr\. $1) AND EMTITLE=~/Re:/
</pattern>
<semantic class>
class($2)=SENDER
</semantic class>
</semantic class analysis knowledge>
```
— sk10

(c)
```
<semantic class analysis knowledge>
<pattern>
{
 /$line/ =~DATETIME
AND
 /$line/ =~/^[^>]/
}
AND
{
 /$line2/ =~DATETIME
AND
 }
 /$line2/ =~/all right/
 OR /$line2/ =~/no problem/
 OR /$line2/ =~/OK/
 }
}
</pattern>
<semantic class>
PLAN
Table(REPLY_SENDER, PLAN)
</semantic class>
</semantic class analysis knowledge>
```
— sk11

FIG. 37

| ACTIVE | | | |
|---|---|---|---|
| NAME \ DATETIME | | First candidate day and hour: 2004.07.07 13:30-15:30 | Second candidate day and hour: 2004.07.08 10:00-12:00 |
| Sato | | | ◯ |
| Saito | | | |
| Okada | | | |

FIG. 38

| ACTIVE | | | |
|---|---|---|---|
| NAME \ DATETIME | | First candidate day and hour 2004.07.07 13:30-15:30 | Second candidate day and hour: 2004.07.08 10:00-12:00 |
| Sato | | | ◯ |
| Saito | | | ◯ |
| Okada | | ◯ | ◯ |

FIG. 39

| Name | e-mail address | affiliation | TEL | FAX |
|---|---|---|---|---|
|  |  |  |  |  |
|  |  |  |  |  |
|  |  |  |  |  |
|  |  |  |  |  |
|  |  |  |  |  |
|  |  |  |  |  |

FIG. 40

TITLE: ARTICLE PROJECT IMBESTIGATION COMMISSION

Mr.Sato, Mr.Saito, Mr.Okada

I am Tanaka in first planning department
I am indebted.

As for article project drafting that talked when met the other day, I would like to open a review meeting according to the following description.

------------------------------------------------------------

Agenda: 2004 year end article projection review meeting
First candidate day: 2004.07.07 13:30-15:30
Second candidate day: 2004.07.08 10:00-12:00
Assignment: Write up individual project concept on a A4 sheet

------------------------------------------------------------

I would therefore like to select convenient date from the above candidate days and send a reply.

Thanks for your help

============================================================
TSB Co. Ltd.
First planning department TARO TANAKA
TEL / FAX : 03-XXXX-1111
E-mail : t-tanaka@tsb.zzz.jp
============================================================

FIG. 41

ARTICLE PROJECT IMBESTIGATION COMMISSION

Mr.Sato, Mr.Saito, Mr.Okada ~at1

I am <SPAN class="SENDER">Tanaka</SPAN> in
<SPAN class="DIV_OR_CO">first planning department</SPAN> ~at2

As for article project drafting that talked when met the other day, I would like to open a review meeting according to the following description.

Agenda : 2004 year end article projection review meeting
First candidate day : 2004.07.07 13:30-15:30
Second candidate day : 2004.07.08 10:00-12:00
Assignment : Write up individual project concept on a A4 sheet I would therefore like to select convenient date from the above candidate days and send a reply.

Thanks for your help

<SPAN class="COMPANY">TSB Co. Ltd. </SPAN> ~at3
<SPAN class="DIV_OR_CO">First planning department</SPAN></SPAN> ~at4
</SPAN>
<SPAN class="SENDER">TARO TANAKA</SPAN> ~at8
TEL/FAX : <SPAN class="FAX"><SPAN class="TEL">03-XXXX-1111</SPAN>
</SPAN>
E-mail :<SPAN class="EMADDRESS">t-tanaka@tsb.zzz.jp</SPAN> ~at5 at6
at7

FIG. 42

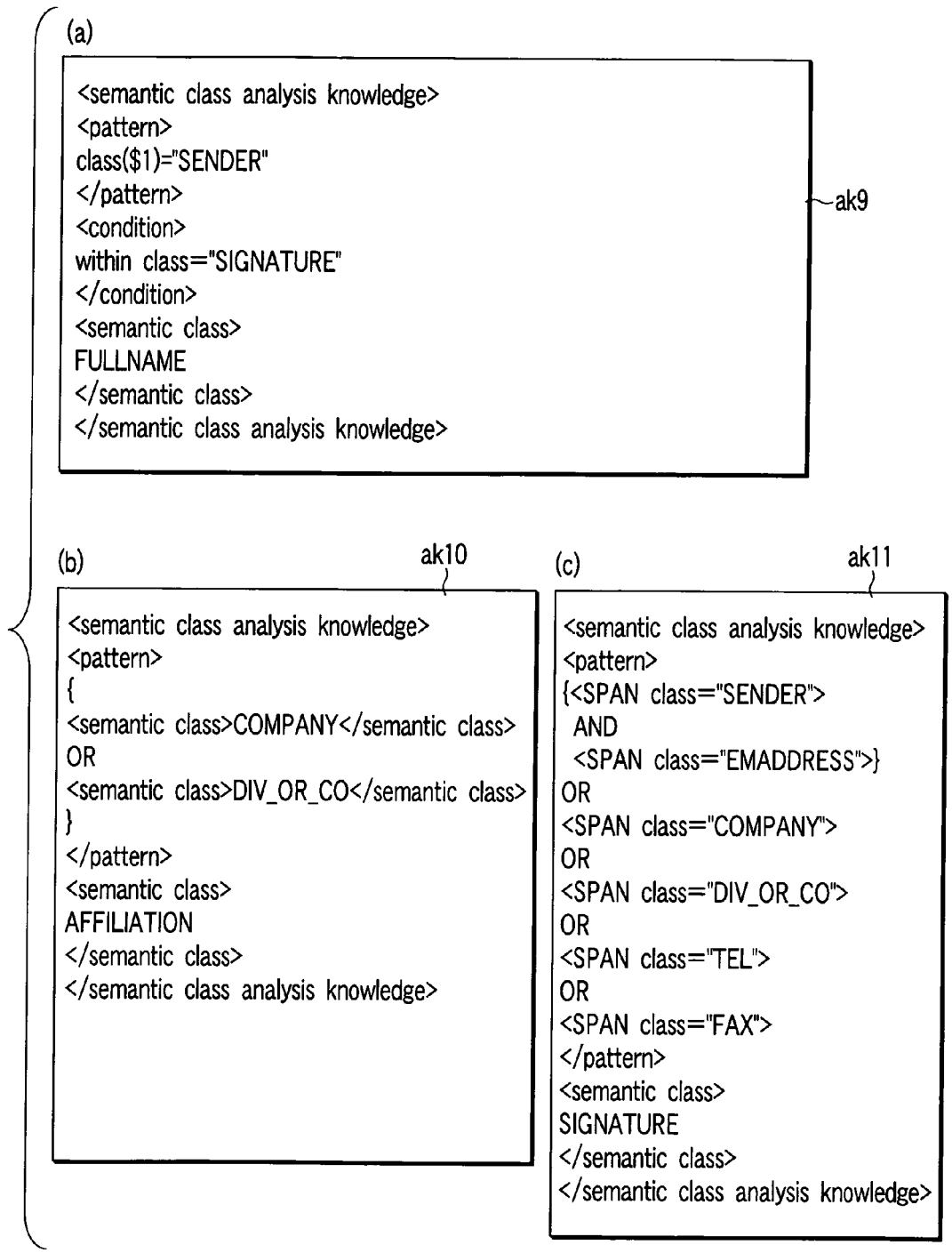
F I G. 44

ARTICLE PROJECT IMBESTIGATION COMMISSION

Mr.Sato, Mr.Saito, Mr.Okada

I am <SPAN class="SENDER">Tanaka</SPAN> in
<SPAN class="DIV_OR_CO">first planning department</SPAN>

As for article project drafting that talked when met the other day, I would like to open a review meeting according to the following description.

---

Agenda : 2004 year end article projection review meeting
First candidate day : 2004.07.07 13:30-15:30
Second candidate day : 2004.07.08 10:00-12:00
Assignment : Write up individual project concept on a A4 sheet I would therefore like to select convenient date from the above candidate days and send a reply.

Thanks for your help

---

<SPAN class="SIGNATURE"> — at9
<SPAN class="AFFILIATION"> — at10
<SPAN class="COMPANY">TSB Co. Ltd. </SPAN>
<SPAN class="DIV_OR_CO">First planning department</SPAN></SPAN>
<SPAN class="SENDER">TARO TANAKA</SPAN></SPAN>
TEL/FAX : <SPAN class="FAX"><SPAN class="TEL">03-XXXX-1111</SPAN>
</SPAN>
E-mail : <SPAN class="EMADDRESS"> t-tanaka@tsb.zzz.jp</SPAN> at11

F I G. 45

ARTICLE PROJECT IMBESTIGATION COMMISSION

Mr.Sato, Mr.Saito, Mr.Okada

I am <SPAN class="SENDER">Tanaka</SPAN> in
<SPAN class="DIV_OR_CO">first planning department</SPAN>

As for article project drafting that talked when met the other day, I would like to open a review meeting according to the following description.

---

Agenda : 2004 year end article projection review meeting
First candidate day : 2004.07.07 13:30-15:30 — at9
Second candidate day : 2004.07.08 10:00-12:00 — at10
Assignment : Write up individual project concept on a A4 sheet

---

I would therefore like to select convenient date from the above candidate days and send a reply.

Thanks for your help

A ~601

<SPAN class="SIGNATURE">
<SPAN class="AFFILIATION">
<SPAN class="COMPANY">TSB Co. Ltd. </SPAN>
<SPAN class="DIV_OR CO">First planning department</SPAN></SPAN>
<SPAN class="SENDER">TARO TANAKA</SPAN></SPAN>
TEL/FAX : <SPAN class="FAX"><SPAN class="TEL">03-XXXX-1111</SPAN></SPAN>
</SPAN>
E-mail :<SPAN class="EMADDRESS"> t-tanaka@tsb.zzz.jp</SPAN> at11

F I G. 46

Intention estimation knowledge information

```
ANNOTATION TYPE ="A"
SEMANTIC_CLASS ="FULLNAME | EMADDRESS | AFFILIATION | TEL | FAX"
WHERE =SIGNATURE
INTENTION ="addition to address book"
```

F I G. 47

Action selection knowledge information

```
INTENTION ="addition to address book"
SEMANTIC_CLASS ="FULLNAME | EMADDRESS | AFFILIATION | TEL | FAX"
ACTION ="add_AddressBook(<SPAN class ="FULLNAME">,<SPAN
class="EMADDRESS">,<SPAN class="AFFILIATION'>),<SPAN class
="TEL">),<SPAN class="FAX">))
```

F I G. 48

Registration rule to address book

```
Name ← SEMANTIC_CLASS="FULLNAME"
E-mail address ← SEMANTIC_CLASS="EMADDRESS"
Affiliation ← SEMANTIC_CLASS="AFFILIATION"
TEL ← SEMANTIC_CLASS="TEL"
FAX ← SEMANTIC_CLASS="FAX"
```

F I G. 49

```
ANNOTATION TYPE ="underline"
DOCUMENT_STRUCTURE=<P>

SEMANTIC_CLASS ="DATE"
INTENTION ="schedule addition"
```

F I G. 52

| Name | E-mail address | Affiliation | TEL | FAX |
|---|---|---|---|---|
| TARO TANAKA | t-tanaka@tsb.zzz.jp | TSB Co. Ltd. First planning department | 03-XXXX-1111 | 03-XXXX-1111 |
| | | | | |
| | | | | |
| | | | | |
| | | | | |
| | | | | |

ACTIVE

F I G. 50

ARTICLE PROJECT IMBESTIGATION COMMISSION

Mr.Sato, Mr.Saito, Mr.Okada

I am <SPAN class="SENDER">Tanaka</SPAN> in
<SPAN class="DIV_OR_CO">first planning department</SPAN>

As for article project drafting that talked when met the other day, I would like to open a review meeting according to the following description.

---

Agenda : 2004 year end article projection review meeting
First candidate day : 2004.07.07 13:30-15:30
Second candidate day : 2004.07.08 10:00-12:00
Assignment : Write up individual project concept on a A4 sheet

---

I would therefore like to select convenient date from the above candidate days and send a reply.

Thanks for your help

A ~ 603

<SPAN class="COMPANY">TSB Co. Ltd. </SPAN>
<SPAN class="DIV_OR_CO">First planning department</SPAN></SPAN>
<SPAN class="SENDER">TARO TANAKA</SPAN></SPAN>
TEL/FAX : <SPAN class="FAX"><SPAN class="TEL">03-XXXX-1111</SPAN>
</SPAN>
E-mail :<SPAN class="EMADDRESS"> t-tanaka@tsb.zzz.jp</SPAN>

602

F I G. 51

INFORMATION PROCESSING METHOD AND APPARATUS

CROSS-REFERENCE TO RELATED APPLICATIONS

This application is based upon and claims the benefit of priority from prior Japanese Patent Application No. 2004-250249, filed Aug. 30, 2004, the entire contents of which are incorporated herein by reference.

BACKGROUND OF THE INVENTION

1. Field of the Invention

The present invention relates to an information processing apparatus.

2. Description of the Related Art

In a conventional technique for providing information to a user and processing an action that the user performs to the provided information, a system referred to as a graphical user interface (GUI) is spread generally. In GUI, the user designates an object on a screen with a designator such as a mouse, and selects an action to be subjected to the object from a menu screen.

In the technique referred to as a context menu in GUI in particular, a selectable operation is limited according to a format of object data to make it easy to designate an action by the user.

An application reading an E-mail utilizes a technique of providing object data by automatically hyperlinking part to be able to consider as an URL or mail address in a document.

There is a technique that when the first document is displayed, other related documents are shown (refer to, for example, Japanese Patent Laid-Open No. 2000-10981).

There is a technique of extracting a mark from a paper document marked by a user and an original document that is not marked, and performing an operation associated with a marked item (refer to, for example, Japanese Patent Laid-Open No. 10-149410).

Further, there is a technique of executing an action based on an annotation input with a pen by a user (refer to, for example, Japanese Patent Laid-Open No. 7-78053 bulletin reference).

The conventional technique only limits operation mechanically based on a formal clue, and is not able to cope with such high level demand that the operation desired by a user changes according to the content of data including a context as well as a format.

Different operations performed on a document by a user naturally, for example, different operations done with a pen, such as encircling the document, underlining the document, surrounding a text, inserting a character string and so on cannot be reflected to selection of the operations in association with the contents of the document.

It is an object of the invention to provide an information processing method capable of subjecting desired information included in a document to a process according to intention of a user, only by marking the document with a underline, a box, a character, a symbol and so on, and an apparatus therefor. For desired information had by the document.

BRIEF SUMMARY OF THE INVENTION

An aspect of the invention provides an information processing apparatus comprising: an input unit configured to input an annotation of at least one of an underline, a box, a character, a character string, a symbol and a symbol string to a displayed document; an annotation recognition unit configured to recognize a type of the annotation and a coverage of the annotation in the document; an intention estimation unit configured to estimate intention of a user based on the type of the annotation and information in the coverage; an action storage unit configured to store a plurality of actions; an action selection unit configured to select an action to be performed for the document from the action storage based on the intention estimated by the intention estimation unit; and an execution unit configured to execute the action selected by the action selection unit.

BRIEF DESCRIPTION OF THE SEVERAL VIEWS OF THE DRAWING

FIG. 2 is a diagram representing an example of a document.

FIG. 3 is a diagram representing an example of semantic class analysis knowledge information.

FIG. 5 is a diagram illustrating an example of document including a semantic class analysis result output by a semantic class analyzer.

FIG. 10 is a diagram illustrating an example of a document in which an ANNOTATION tag is inserted.

FIG. 11 is a diagram illustrating an example of a document in which an ANNOTATION tag is inserted.

FIG. 12 is a diagram illustrating an example of a document in which an ANNOTATION tag is inserted.

FIG. 14 is a diagram illustrating an example of a document including an annotation recognition result output by an annotation unit.

FIG. 15 is a diagram illustrating an example of a document including an annotation recognition result output by an annotation unit.

FIG. 16 is a diagram illustrating an example of a document including an annotation recognition result output by an annotation unit.

FIG. 19 is a diagram illustrating an example of a document including an intention estimation result output by an intention estimation unit.

FIG. 20 is a diagram illustrating an example of a document including an intention estimation result output by an intention estimation unit.

FIG. 21 is a diagram illustrating an example of a document including an intention estimation result output by an intention estimation unit.

FIG. 24 is a diagram illustrating another example of a document to explain a process operation of an information processing apparatus concerning the second embodiment.

FIG. 26 is a diagram illustrating an example of a document including a semantic class analysis result output by a semantic class analyzer.

FIG. 27 is a diagram illustrating an example of semantic class analysis knowledge information embedded in a script.

FIG. 28 is a diagram illustrating an example of inputting an annotation on a display screen.

FIG. 29 is a diagram illustrating another example including a document including an annotation recognition result output by an annotation unit.

FIG. 30 is a diagram showing an example of intention estimation knowledge information applied to the document of FIG. 28.

FIG. 32 is a diagram illustrating an example of a schedule table made by carrying out an action selected by an action execution unit.

FIG. 33 is a diagram illustrating another example of inputting an annotation on a display screen.

FIG. 34 is a diagram illustrating another example of a document including an annotation recognition result output by an annotation unit.

FIG. 35 is a diagram illustrating a display example of a schedule table made by carrying out an action selected by an action execution unit.

FIG. 36 is a diagram illustrating an example of a reply mail including a semantic analysis result output by a semantic class analyzer.

FIG. 37 is a diagram illustrating an example of semantic class analysis knowledge information used in a semantic class analysis process of a reply mail.

FIG. 38 is a diagram illustrating a result obtained by executing an action for a reply mail.

FIG. 39 is a diagram illustrating a result obtained by executing an action for a reply mail.

FIG. 40 is a diagram illustrating an example of schema of an address book to explain a process operation of an information processing apparatus concerning the third embodiment.

FIG. 41 is a diagram illustrating an example of a document to explain a process operation of an information processing apparatus concerning the third embodiment.

FIG. 42 is a diagram illustrating an example of a document including a result obtained by subjecting the document of FIG. 41 to a semantic class analysis using semantic class analysis knowledge information of FIG. 43.

FIG. 44 is a diagram illustrating an example of expanded semantic class analysis knowledge information used in a semantic class analyzer.

FIG. 45 is a diagram illustrating an example of a document including a semantic class analysis result output by a semantic class analyzer.

FIG. 46 is a diagram illustrating an example of inputting an annotation on a display screen.

FIG. 47 is a diagram illustrating an example of intention estimation knowledge information applied to the document of FIG. 45.

FIG. 48 is a diagram illustrating an example of action selection knowledge information applied to a document of FIG. 45.

FIG. 49 is a diagram illustrating an example of a registration rule to an address book used in an action execution.

FIG. 50 is a diagram illustrating an example of displaying an address book obtained by executing an action.

FIG. 51 is a diagram illustrating another example of inputting an annotation on a display screen.

FIG. 52 is a diagram illustrating another example of intention estimation knowledge information.

DETAILED DESCRIPTION OF THE INVENTION

There will now be explained an embodiment of the present invention referring to drawing.

First Embodiment

The first embodiment describes an information processing apparatus of displaying contents in Internet or a content of an E-mail including a HTML format, and executing an action concerning displayed contents in response to input from a user with a pen. This can realize a notebook type personal computer capable of inputting with a pen or a personal digital assistant (PDA).

Figure 1:
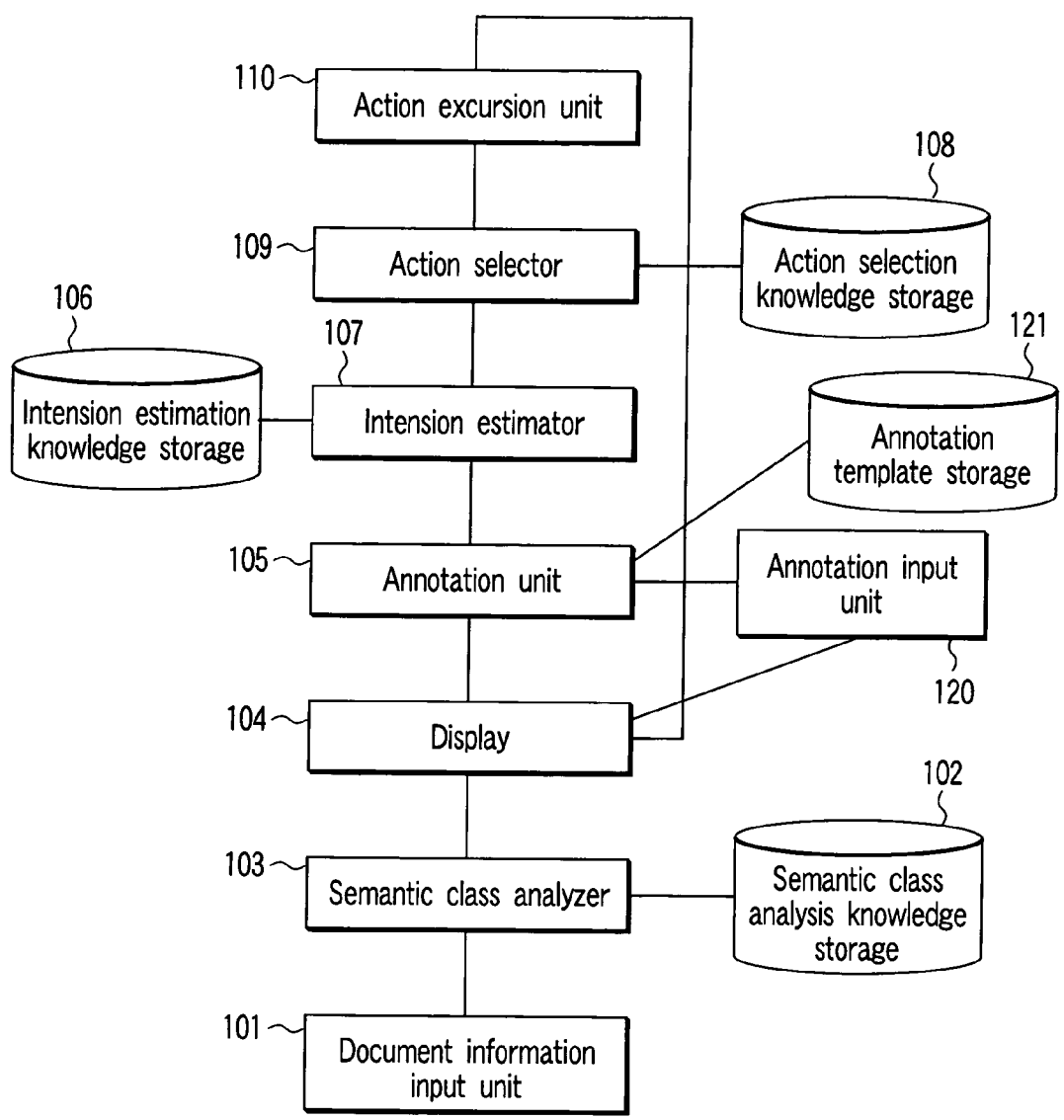
FIG. 1 is a block circuit diagram of an information processing apparatus concerning first to third embodiments.

FIG. 1 shows an example of construction of an information processing apparatus concerning the first embodiment.

A document information input unit 101 is one for inputting document information. This document information may be documents of various kinds of formats such as documents obtained by converting a document of a HTML format, a document described in XML (Extensible markup language), a plaintext document having no structure, a document printed on a paper sheet into electronic texts by a known OCR technique. These documents are input to a document information input unit 101 via a recording medium or a network.

The document information input unit 101 includes an input device acquiring a coordinate when superimposing a transparent tablet on a screen of a given display unit, and moving on the display screen (tablet) a pointing device such as a pen (a stylus).

A semantic class analysis knowledge memory 102 stores semantic class analysis knowledge information for discriminating a part representing a semantic class set beforehand from a character string included in document information input by the document information input unit 101. A semantic class analyzer 103 analyzes a document input with the document information input unit 101 based on semantic class analysis knowledge information stored in the semantic class analysis knowledge memory 102, and extracts a part representing a semantic class set beforehand to output a semantic class analysis result obtained by surrounding the part with analysis result tags. A display unit 104 displays document information input with the document information input unit 101.

An annotation input unit 120 is one for inputting a desired annotation to document information displayed on the display unit 104 with, for example, a pen. Concretely, a user writes a desired annotation with a pen at a desired position in a document displayed on the display unit 104. An input annotation (written in with a pen) indicates an underline, a box, a character, a character string, a symbol and a symbol string. Anything predetermined as an annotation is available. The input is not limited to an input with a pen, and a given annotation may be input by key operation of a keyboard.

An annotation unit 105 recognizes the type of the annotation input from the annotation input unit 120, and coverage of the annotation in a document text. When determining the type of the input annotation by a character recognition, the annotation unit 105 refers to an annotation template stored in an annotation template memory 121. The annotation template includes special feature information required for recognizing a character or a symbol that can be input as an annotation.

An intention estimation knowledge memory 106 stores intention estimation knowledge information for estimating intention of the user, based on document information input with the document information input unit 101, a semantic class analysis result which is an output of the semantic class analyzer 103 and a recognition result of the annotation input from the annotation input unit 120.

An intention estimation unit 107 estimates intention of the user according to the intention estimation knowledge information stored in the intention estimation knowledge memory 106, based on the document information input with the document information input unit 101, the semantic class analysis result which is an output of the semantic class analyzer 103, and the recognition result of the annotation input from the annotation input unit 120.

An action selection knowledge memory 108 stores action selection knowledge information for selecting an action for input document information input by the document information input unit 101, based on the an intention estimation result that is an output of the intention estimation unit 107.

An action selection unit 109 selects an action for document information input from the document information input unit 101 based on the intention estimation result that is the output of intention estimation unit 107, according to the action selection knowledge information stored in the action selection knowledge memory 108. An action execution unit 110 executes the action selected by the action selection unit 109.

There will be described an operation of the information processing apparatus concerning the first embodiment in detail with a specific example.

For example, a case that an Internet document or E-mail of a HTML format as shown in FIG. 2 is input with the document information input unit 101 will be described as an example. FIG. 2 omits one part of document information.

The document information input with the document information input unit 101 is not limited to a document of HTML format as shown in FIG. 2, and may be documents of various kinds of formats such as a document described in XML (Extensible markup language), a document of a plaintext having no structure, and a document of an electronic text to which a document printed on a paper sheet is converted by a known OCR technique. The document information input with the document information input unit 101 is send to the semantic class analyzer 103.

A document as a to-be-processed object has a hierarchical structure comprising a plurality of elements surrounded with tags of an arbitrary title like a XML document described in XML. In the case of the document that information of a document are already classed in various semantic classes by tag names, the document may be just displayed on a given display screen of the display unit 104 without doing a semantic class analysis process in the semantic class analyzer 103 (with skipping a process in the semantic class analyzer 103), and then the process is advanced to a next process.

FIG. 3 shows an example of semantic class analysis knowledge information stored in the semantic class analysis knowledge memory 102. The semantic class analysis knowledge information includes a pattern that information belonging to the semantic class has, for example, a pattern formed of a character string or a symbol, and a semantic class representing an attribute such as a type or meaning of information to match the pattern.

Figure 4:
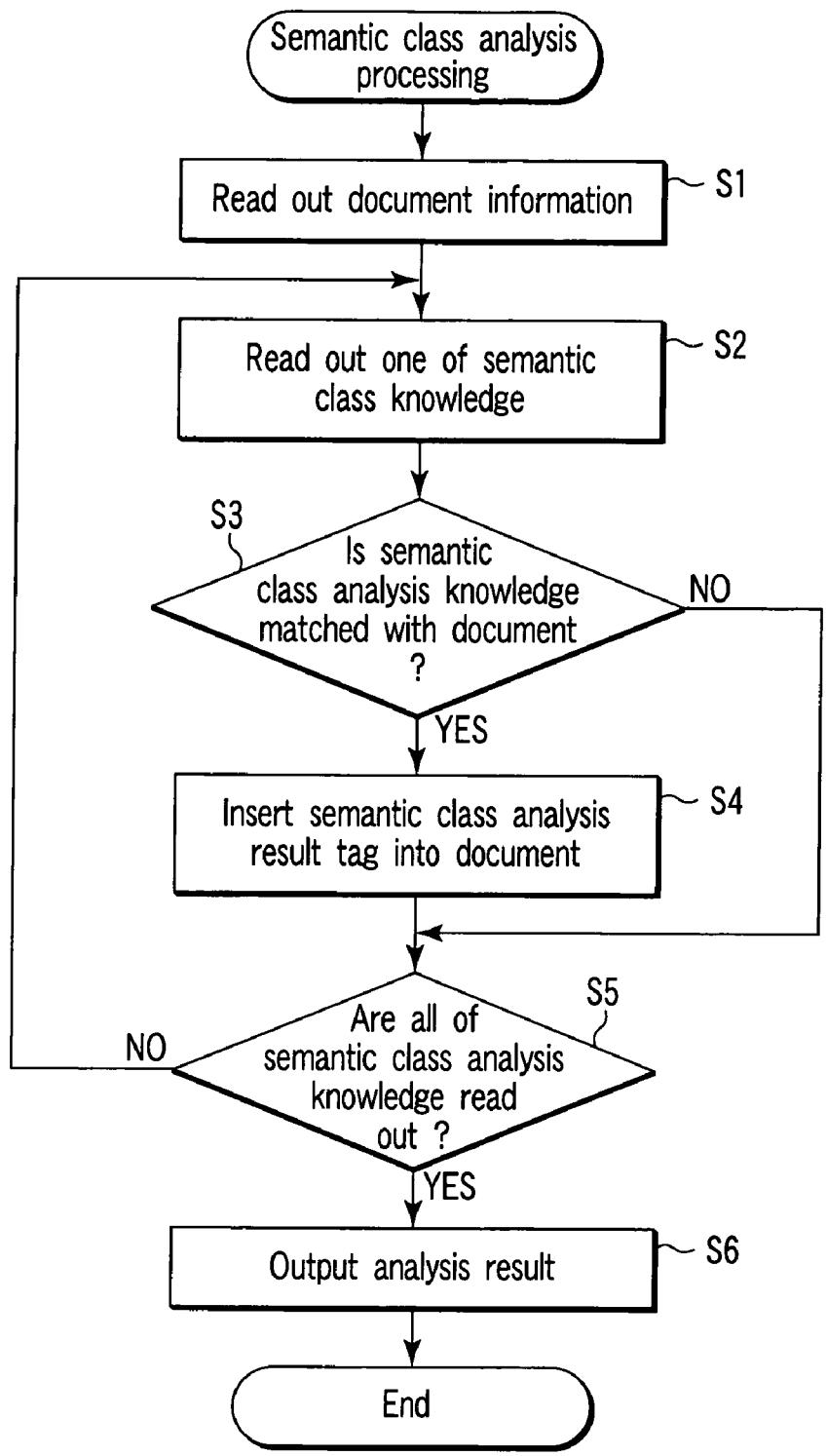
FIG. 4 is flowchart for explaining a semantic class analysis process operation in a semantic class analyzer.

The semantic class analyzer 103 analyzes a semantic class of document information according to the flowchart shown in FIG. 4. The semantic class analyzer 103 can use a semantic class analysis technique, for example, a well-known peculiar expression extract method ("consideration on relation between question answering, expression extract peculiar to Japanese, and peculiar expression system", Yumi Ichimura, et al., Information Processing Society research report, NL-161-3, 2004).

The semantic class analyzer 103 reads document information send from the document information input unit 101 (step S1). Assume that the document information shown in FIG. 2 is read. One of semantic class analysis knowledge information stored in the semantic class analysis knowledge memory 102 is read out (step S2). An example that the semantic class analysis knowledge information 301 of FIG. 3 is read will be described herein.

The semantic class analyzer 103 extracts a pattern (value surrounded with pattern tags) from the read semantic class analysis knowledge information 301. In this example, a pattern of so-called ([A-Z]+) Co. Ltd. is extracted. The pattern uses a regular expression of a Perl language ("programming Perl", Larry Wall, Tom Christiansen, written by Randal L. Schwartz, translated by Yoshiyuki Kondo, O'Reily Japan, 1997).

The pattern of the semantic class analysis knowledge information 301 represents existence of a character string aside from a word of one or more continuous characters just before a character string of "Co. Ltd.". It is determined that the character string matching this pattern is a semantic class of "COMPANY".

The document information read in step S1 matches the pattern of the semantic class analysis knowledge information extracted in step S2, and it is determined whether they match each other (step S3). In an example when this semantic class analysis knowledge information 301 is read, a character string of "TSB Co., Ltd." in the document information of FIG. 2 matches the pattern of the semantic class analysis knowledge information (Yes of step S3).

The embodiment is described based on a simple pattern here. However, actually, after subjecting the document information read in step S1 to a morphological analysis, it is matched with a pattern of the analysis knowledge information. As a result, a character string corresponding to the pattern in a high accuracy can be acquired.

Since a character string of "TSB Co., Ltd." in the document information of FIG. 2 matches a pattern of the semantic class analysis knowledge information 301 in step S3, the process advances to step S4 to insert semantic class analysis result tags (referred to as analysis result tag hereinafter) in both ends of the character string. The semantic class belonging to the character string is described on the inserted tags as an attribute. In other words, in the event of the character string "TSB Co. Ltd.", the SPAN tags of the analysis result tags representing the attribute that the semantic class is "COMPANY" are inserted in both ends of the character string "TSB Co. Ltd.", resulting in making "<SPANclass="COMPANY"> TSB Co., Ltd.</SPAN>". In other words, one SPAN element is generated by surrounding a certain character string with a beginning tag (for example, <SPAN>) and an ending tag (for example, </SPAN>), and providing a semantic class attribute of a semantic class analysis result.

In step S3, when the document information includes no character string matching the pattern of the semantic class analysis knowledge information does (No of step S3), step S4 is skipped and step S5 is executed.

The process of steps S3 and S4 is repeatedly executed for all semantic class analysis knowledge information stored in the semantic class analysis knowledge memory 102 (step S5). Assume that the process is executed for semantic class analysis knowledge information 301-308 of FIG. 3 here. When the process is finished for all semantic class analysis knowledge information, the semantic class analyzer 103 outputs an analysis result (step S6). An example of an analysis result obtained by the semantic class analyzer 103 is shown in FIG. 5.

FIG. 5 shows an example of outputting an analysis result in a form that information describing, using a SPAN tag of HTML tag (a tag defining a range surrounded with tags <SPAN> </SPAN> as a bunch), a semantic class as an attribute of this SPAN tag is inserted in original document information. The analysis result needs not have a format shown in FIG. 5, and may be output as data different from the document information, for example, by expressing a position of the document information on a location corresponding to the analysis result by the number of characters or the number of bytes from the head of the document information.

Figure 6:
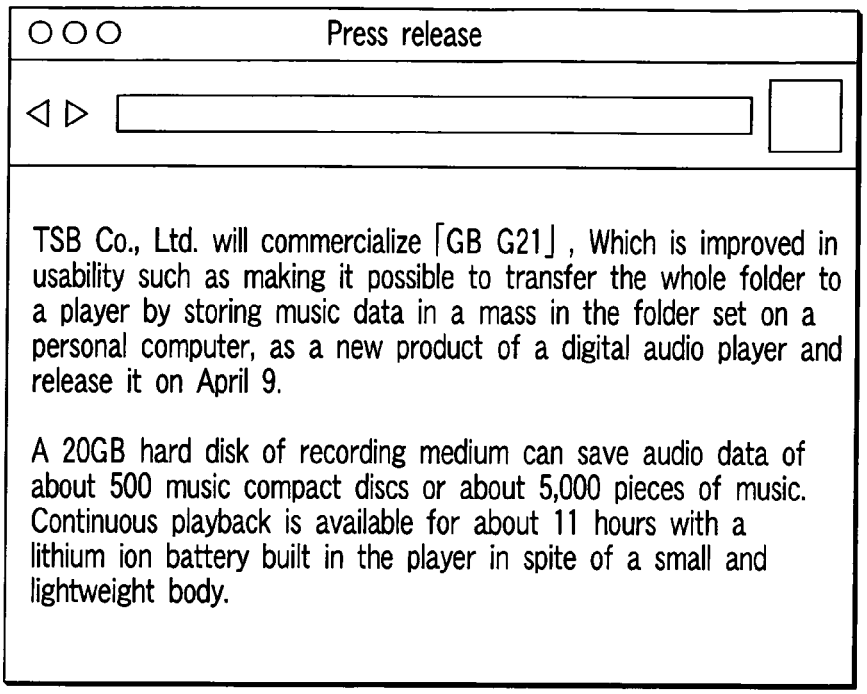
FIG. 6 is a diagram illustrating a display example displaying on a display unit a document of FIG. 5.

The analysis result output from the semantic class analyzer 103 is sent to the display unit 104. A display example of document information displayed on the display unit 104 is shown in FIG. 6. The display unit 104 displays a HTML document subjected to rendering like an existing Internet contents reading application.

Since the semantic class analysis result shown in FIG. 5 is buried in the document information in the HTML format that the analysis result tag does not influence the rendering, FIG. 6 shows a display example of the analysis result without displaying the analysis result tag itself. However, the semantic class analysis result may be displayed. Alternatively, a display method may be designated to the attribute class included in the SPAN element in the semantic class analysis result, to reflect a result of the semantic class analysis to display of the display unit 104.

The user who reads document information displayed on the display unit 104 inputs an annotation concerning document information with the annotation input unit 120. The annotation input unit 120 inputs the annotation directly to a screen of the display unit 104 with a pen. Such an input method of annotation may utilize a technique realized by a pen input notebook type personal computer such as a so-called PDA or tablet personal computer. Examples of annotations input to the display screen shown in FIG. 6 by a user are shown in FIGS. 7 to 9.

Figure 7:
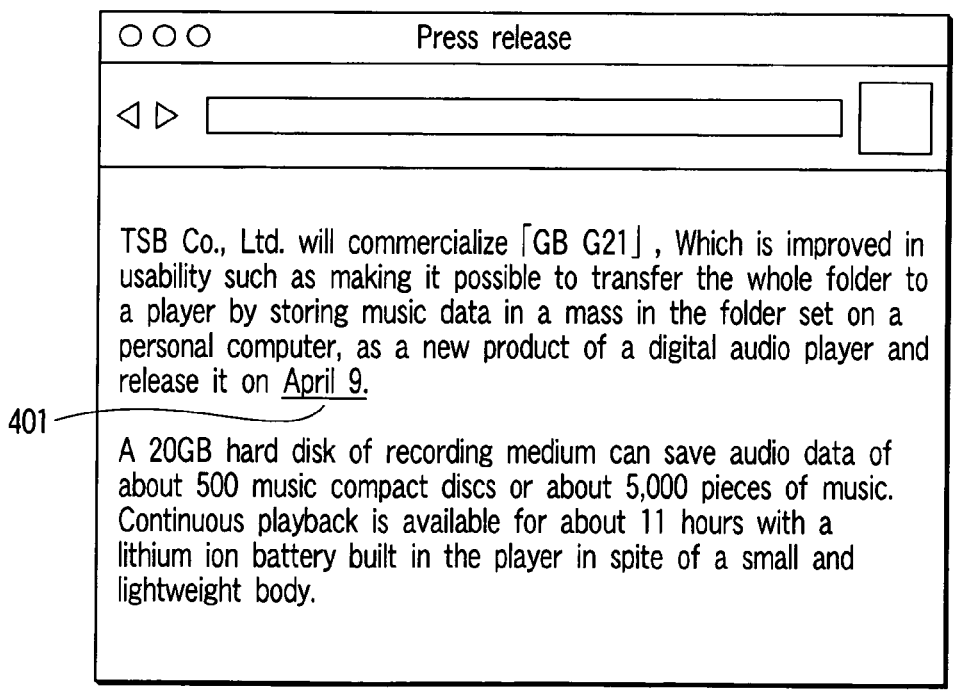
FIG. 7 is a diagram illustrating an example of an annotation (an underline) input into a displayed document.

In the example of FIG. 7, an underline (annotation 401) is drawn on a character string part "April 9" of the document information displayed on the display unit 104. In the example of FIG. 8, the second paragraph part of the document information displayed on the display unit 104 is surrounded with a box. This box is annotation 402. In the example of FIG. 9, a question mark (annotation) 403 is written in near a character string "GBG21" of document information displayed on the display unit 104.

The annotation input unit 120 identifies each annotation by the fact that the path of the annotation is continuous or the fact that if the path of the annotation is discontinuous, a time period between the discontinuous paths is shorter than a preset time. The annotation input unit 120 detects information such as a start point (beginning with a pen) and end point (ending with the pen) of each input annotation, a stroke order, a direction or length of the line (length of the path), a position, in units of pixels configuring a display screen, using a lower-left of the display screen as a reference.

Figure 8:
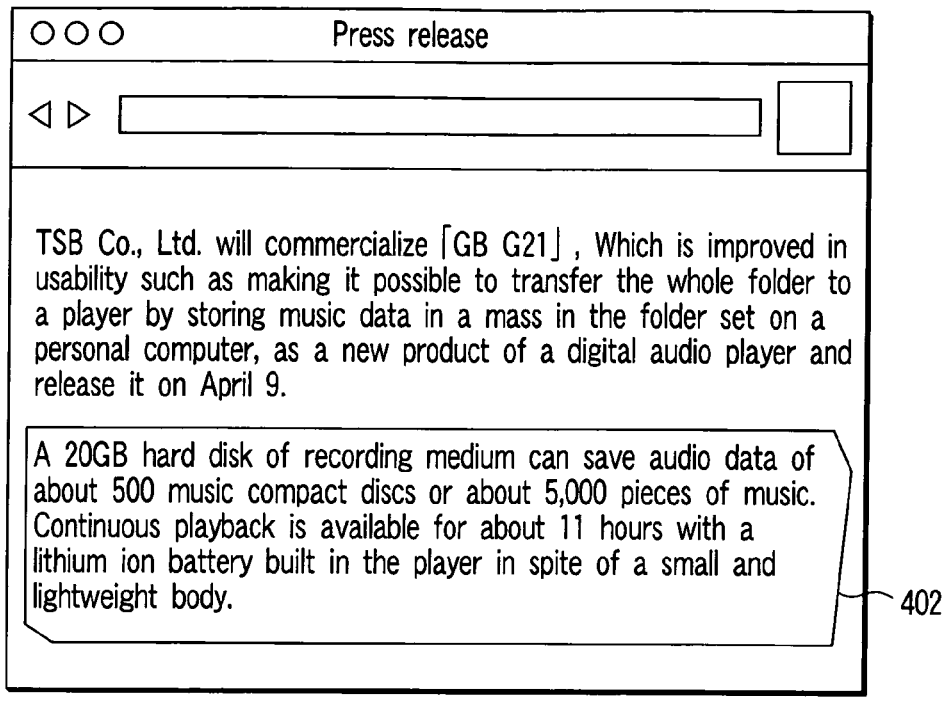
FIG. 8 is a diagram illustrating an example of an annotation (a box) input into a displayed document.
Figure 9:
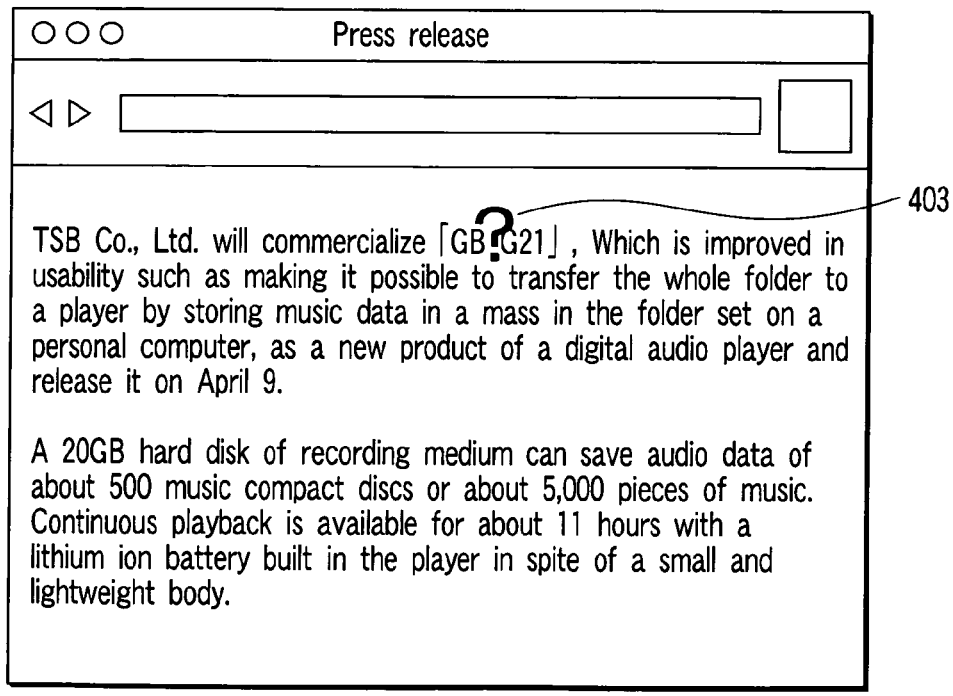
FIG. 9 is a diagram illustrating an example of an annotation (insertion "?") input into a displayed document.

The annotation unit 105 recognizes a coverage of each document annotation from a coordinate or a path length between the start and end points of each of the annotations 401-403 shown in FIGS. 7 to 9, and inserts an "ANNOTATION" tag in the beginning and trailing ends of the coverage of the document and treats it as internal representation as shown in FIGS. 10 to 12.

In an example of FIG. 10, startX, startY show X and Y coordinates of the start point of the annotation 401, and endX, endY show X and Y coordinates of the end point of the annotation 401. The "length" shows a length of the path as a route from the start point to end point of the annotation 401. Information such as the coordinate values of the start and end points of the annotation 401 and the length of the path thereof are inserted in both ends of the character string in which the annotation 401 is written and which corresponds to the coverage of the annotation 401, using the "ANNOTATION" tag. A reference point of each coordinate and a unit thereof may be defined every processing system. For example, in FIG. 10, the lower-left of a screen is set to a reference, and pixels configuring the screen are a unit.

The annotation unit 105 determines whether the input annotation belongs to any one of a plurality of predetermined types. Assume that annotations are three kinds of "underline", "box" and "note" shown in FIGS. 7 to 9.

The annotation unit 105 determines from a coordinate on the screen of the document information and a coordinate of the annotation whether the annotation input on a display screen is input to what part of the document information displayed on the display screen.

Figure 13:
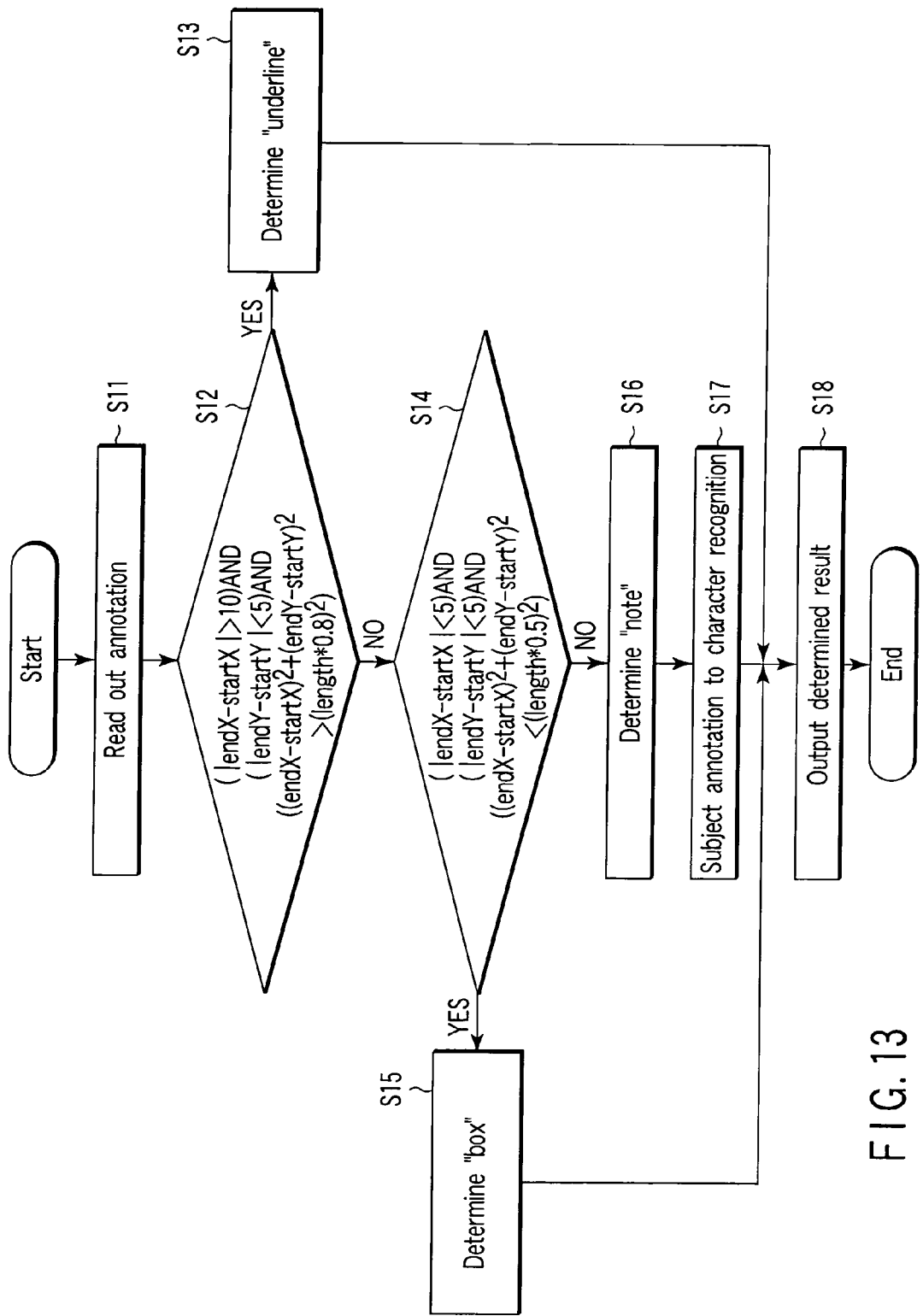
FIG. 13 is flowchart for explaining a process of determining type of an annotation in an annotation unit.

FIG. 13 is flowchart to explain a determination process of type of the annotation, which is executed by the annotation unit 105.

The input annotation is read in step S11. In steps S12 to S14, the type of the annotation is determined using a value of each of the start point (startX, startY), the end point (endX, endY) and the length of the path.

In step S12, it is checked whether a condition that the annotation is "underline" is satisfied. In other words, when a difference between the X coordinate of the start point and the X coordinate of the end point is larger than a given value (for example, "10"), a difference between the Y coordinate of the start point and the Y coordinate of the end point is smaller than a given value (for example, "5"), and a distance between the start and end points is longer than a value obtained by multiplying the length of the path by a predetermined number (for example, 0.8), the process advances to step S13, and it is determined that the annotation is "underline".

In the case of the annotation 401 of FIG. 7, the start point is startX=101, startY=52, the end point is endX=123, endY=54, and the length of the path is length=26 s as shown in FIG. 10. Thus, $|endX-startX|=22(>10),$ $|endY-startY|=2(<5),$ $(endX-startX)^2+(endY-startY)^2=488,$ $(length*0.8)^2=432.64$ For the purpose of satisfying the condition that the annotation is to be "underline", the type of the annotation 401 is determined to be "underline".

In the case of the annotation 401 of FIG. 8, as shown in FIG. 11, the start point is startX=14, startY=43, the end point is endX=14, endY=42, the length of a path is length=221. Thus, |endX−startX|=0 (<10) or the condition that the annotation is to be "underline" is not satisfied.

In the case of the annotation 403 of FIG. 9, the start point is startX=24, startY=62, the end point is endX=25, endY=51, the length of the path is length=24 s as shown in FIG. 12. Thus, |endX−startX|=1 (<10). In other words, the condition that the annotation is to be "underline" is not satisfied.

When the annotation does not satisfy a condition to be "underline" in step S12, the process advances to step S14, to check whether the annotation satisfies a condition for the annotation to be "box". In other words, if the difference between the X coordinate of the start point and the X coordinate of the end point is smaller than a given value (for example, 5), a difference between the Y coordinate of the start point and the Y coordinate of the end point is smaller than a given value (for example, 5), and a distance between the start point and the end point is shorter than a value obtained by multiplying a length of a bus by a given number (for example, 0.5), the process advances to step S15, to determine that the annotation is a "box".

In the case of the annotation 402 of FIG. 8, $|endX-startX|=0 (<5)$, $|endY-startY|=1 (<5)$, $(endX-startX)^2+(endY-startY)^2=1$, $(length*0.5)^2=12210.25$ Therefore, the type of the annotation 402 is determined to be "box" to satisfy a condition to be "box".

On the other hand, in the case of the annotation 403 of FIG. 9, $|endX-startX|=1 (<5)$, $|endY-startY|=11 (>5)$, Therefore, the condition to be "box" is not satisfied. In the case of the annotation that does not satisfy the condition to be "underline" and the condition to be "box", the process advances to step 16 and the "note" is determined. Accordingly, the annotation 403 of FIG. 9 is determined as "note" in step S16.

When "note" is determined, the process advances to step S17. With a known character recognition technique, particularly an online character recognition technique of character-recognizing an input stroke in a real time, it is determined what kind of "note" the annotation 403 is, that is, the type of the note (the type of the inserted character, symbol, etc.) is determined. In other words, the annotation unit 105 collates the annotation determined as "note" with each template stored in the annotation template memory 121, to obtain a score (similarity) indicating how much a vector of a line of the annotation or character information matches each of templates stored in the annotation template memory 121 beforehand, and acquire a template of maximum similarity. It is determined that a character or symbol corresponding to the template of maximum similarity is the type of the note corresponding to the annotation. For example, the type of the note of the annotation 403 is determined to be "?".

In step S18, a result of the above-mentioned determination process is output. In other words, the type of each annotation input to the document, which is determined by the annotation unit 105 is written in the document as a type attribute of the "ANNOTATION" tags inserted in the beginning and trailing ends of the coverage of each annotation in the document as shown in FIGS. 14 to 16. When "note" is determined, the type of this note is written in the document as the value attribute of "ANNOTATION" tags.

For example, when the type of the annotation 401 of FIG. 7 is determined to be "underline", the "underline" is inserted in the document as the type attribute of the "ANNOTATION" tag as shown in FIG. 14. When the type of the annotation 402 of FIG. 8 is determined to be "box", the "box" is inserted in the document as the type attribute of the "ANNOTATION" tag as shown in FIG. 15. When the type of the annotation 403 of FIG. 9 is determined to be "note", the "note" is inserted in the document as the type attribute of the "ANNOTATION" tag, and "?" is inserted in the document as the value attribute as shown in FIG. 16.

In this way, when the type of the annotation is "underline" or "box", the type of the annotation is uniquely specified by the type attribute. When the type of the annotation is "note", the type of the annotation is uniquely specified by a type attribute and a value attribute.

The intention estimation unit 107 estimates intention of a user for each annotation element surrounded with "ANNOTATION" tags in the document information, based on the document information as shown in FIGS. 14 to 16.

Figure 17:
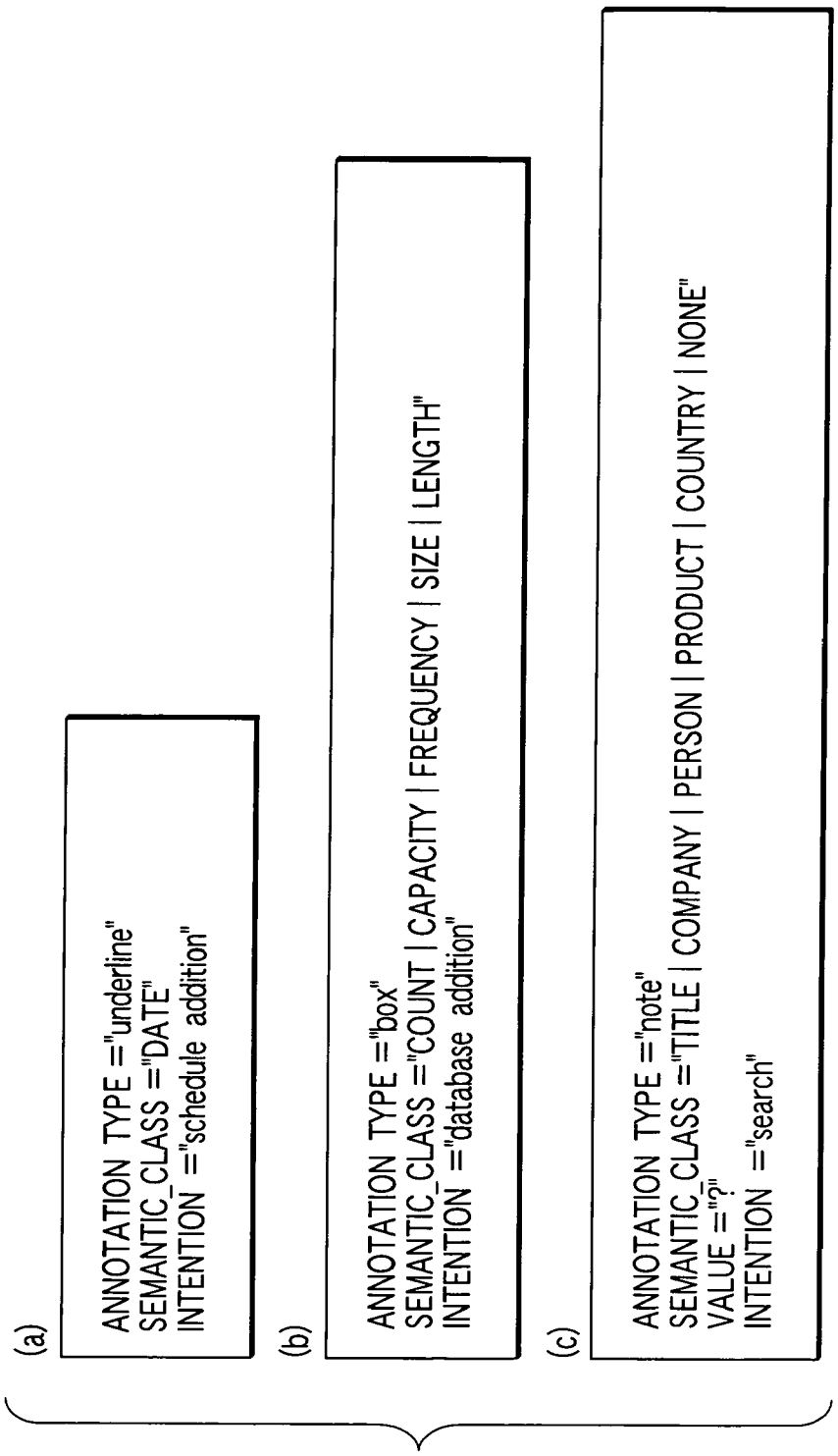
FIG. 17 is a diagram illustrating an example of intention estimation result knowledge information.

FIG. 17 shows an example of intention estimation knowledge information stored in the intention estimation knowledge memory unit 106. Each intention estimation knowledge information includes each intention (INTENTION) of the user, a value of a type attribute (ANNOTATION_TYPE) of an annotation element surrounded with the "ANNOTATION" tags and a value of a value attribute (VALUE) thereof, a value of a semantic class (class) attribute (SEMANTIC_CLASS) of the "SPAN" tags contained in the annotation element, etc. Each intention (INTENTION) of the user can be specified by the value of the type attribute of the annotation element or the value of the value attribute thereof, and the value of the semantic class (class) attribute of the "SPAN" tags contained in the annotation element.

The intention estimation knowledge information shown in FIG. 17(a) indicates that the intention of the user for the annotation element is "schedule addition", when such SPAN element that the semantic class is "DATE" is included in the annotation element wherein the type attribute is "underline". The intention estimation knowledge information shown in FIG. 17(b) indicates that the intention of the user for the annotation element is "database addition", when the SPAN element of the semantic class of at least one of "COUNT", "CAPACITY", "FREQUENCY", "SIZE" and "LENGTH" is included in the annotation element that the type attribute is "underline". The intention imputed knowledge information shown in FIG. 17(c) indicates that the intention of the user for the annotation element is "search", when the SPAN element of the semantic class of at least one of "TITLE", "COMPANY", "PERSON", "PRODUCT", "COUNTRY" and "NONE" is contained in the annotation element that the type attribute is "note" and the value attribute is "?".

Figure 18:
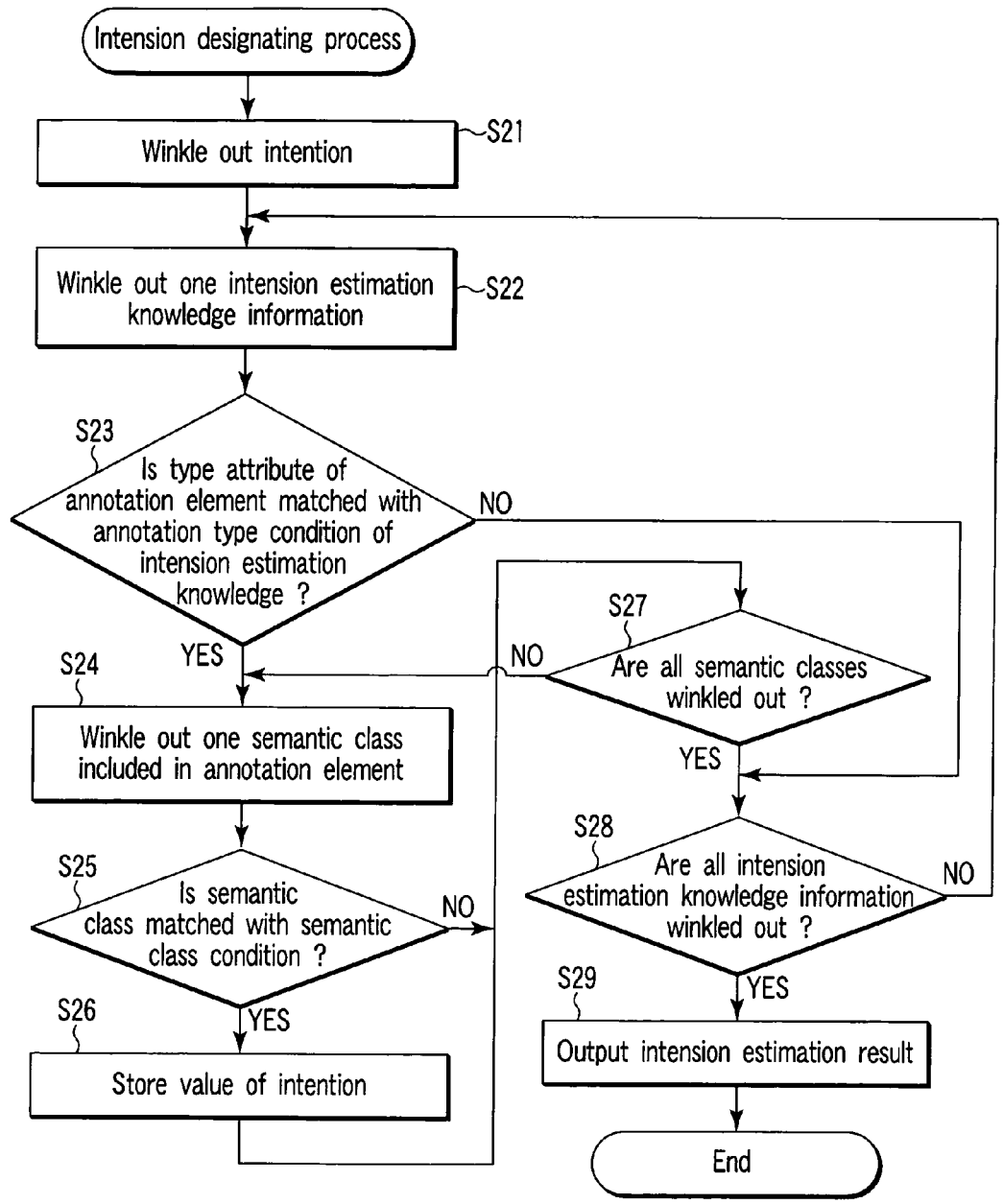
FIG. 18 is flowchart to explain a process operation of an intention estimation unit.

FIG. 18 is flowchart for explaining a processing operation of the intention estimation unit 107. There will be described an example for estimating the intention of the user from each annotation element, based on the document information which a recognition result (the type of the annotation (type attribute or value attribute) and the coverage of the annotation) of the annotation in the annotation unit 105, as shown in FIGS. 14 to 16.

When receiving document information including the recognition result of the annotation from the annotation unit 105, the intention estimation unit 107 executes a process shown in FIG. 18 for each annotation element included in the document information. When one annotation element is extracted (step S21), one intention estimation knowledge information is extracted from the intention estimation knowledge memory 106 (step S22).

When the value of the type attribute of the annotation element coincides with the value of the "ANNOTATION_TYPE" item of the intention estimation knowledge information (or one of a plurality of values in the case of a condition that the value of the type attribute has only to coincide with one of the plurality of values) (step S23), the process advances to step S24. In step S24, the semantic class (the value of the class attribute) of one of the SPAN elements contained in the annotation element is extracted. When this extracted semantic class matches a semantic class designated by the "SEMAN TIC_CLASS" term of the intention estimation knowledge information or one of a plurality of semantic classes (step S25), the value described in the "INTENTION" item of the intention estimation knowledge information is temporarily stored (step S26).

The process of steps S24 to S26 is executed for the semantic classes of all SPAN elements contained in the annotation element (step S27). In this time, in step S25, when each semantic class of a plurality of SPAN elements contained in one annotation element matches a semantic class specified by the item of "SEMANTIC_CLASS" of the intention estimation knowledge information, the value described in the item of "INTENTION" of the intention estimation knowledge information is stored in postscript in each case. The process of steps S22 to S27 is repeated for all intention estimation knowledge information stored in the intention estimation knowledge memory 106 (step S28).

When collation of the annotation element with all intention estimation knowledge information (steps S22 to S27) is finished (step S28), a list with a value of the "INTENTION" item in the intention estimation knowledge information provided about the annotation element (stored temporarily in step S26) is output (step S29). In the list, intention of the user estimated for the annotation element is enumerated. In the case of the annotation element of FIG. 14, the type attribute is "underline" and the SPAN element that the semantic class is "DATE" is included in the annotation element. Therefore, this conforms with the intention estimation knowledge information of FIG. 17(*a*). The "schedule addition" described in this "INTENTION" item is output as an intention estimation result (step S29 of FIG. 18). This intention estimation result is described as INTENTION attribute of the annotation element as shown in FIG. 19, for example.

Similarly, in the case of the annotation element of FIG. 15, the type attribute is "box" and a SPAN element such that the semantic class is "CAPACITY" or "COUNT" is included in the annotation element. Therefore, this matches the intention estimation knowledge information of FIG. 17(*b*). Accordingly, the "database addition" described in this "INTENTION" item is described as INTENTION attribute of the annotation element as shown in FIG. 20.

In the case of the annotation element of FIG. 16, the type attribute is "note" and the value attribute is "?", and a SPAN element such that the semantic class is "TITLE" is included in the annotation element. Therefore, this matches the intention estimation knowledge information of FIG. 17(*c*). Accordingly, the "search" described in this "INTENTION" item is described as INTENTION attribute of the annotation element as shown in FIG. 21.

The action selection unit 109 selects an action for each annotation element based on an intention estimation result as shown in FIGS. 19 to 21.

Figure 22:
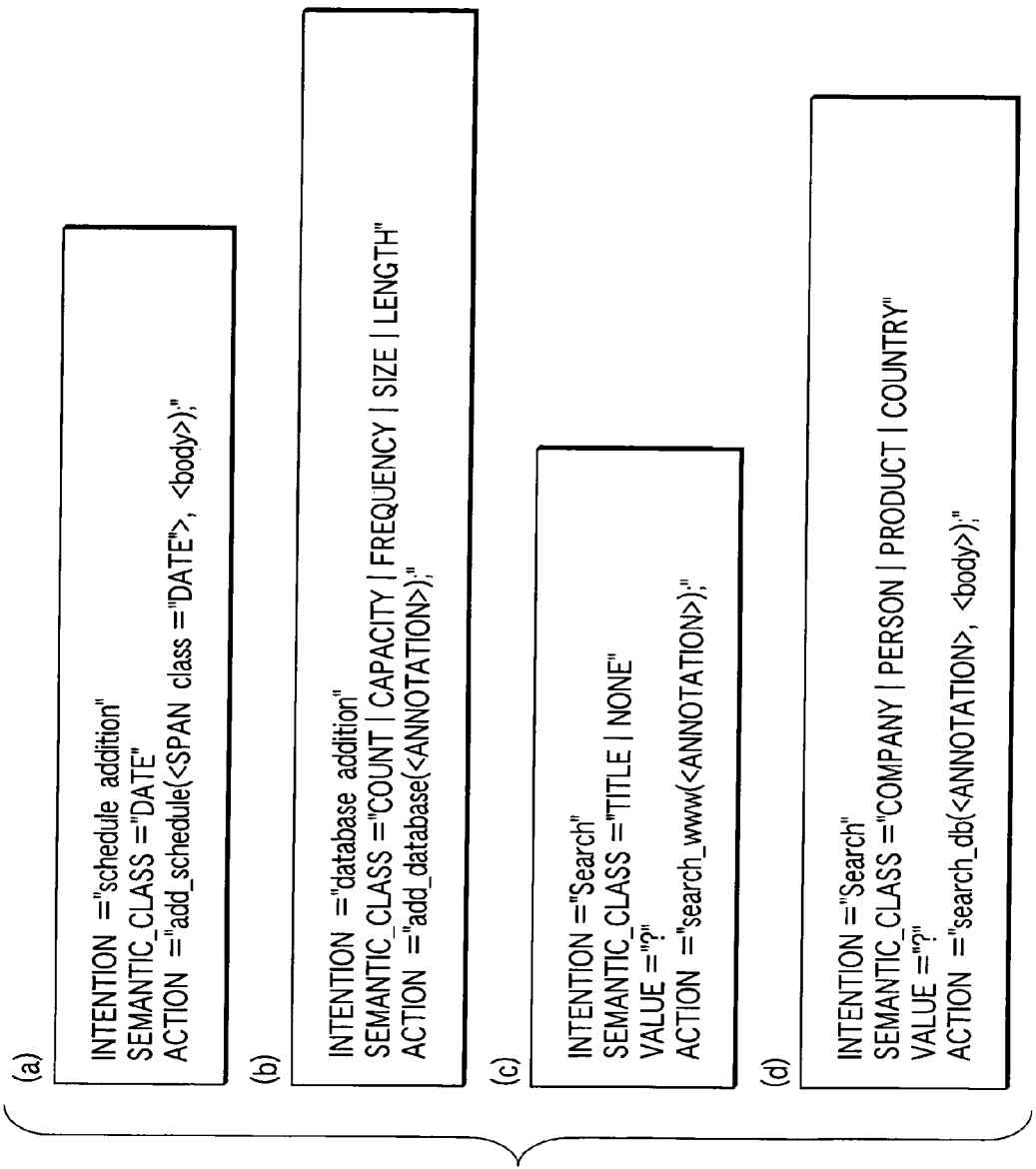
FIG. 22 is a diagram illustrating an example of action selection knowledge information.

FIG. 22 shows an example of the action selection knowledge information stored in the action selection knowledge memory 108. Each action selection knowledge information includes a to-be-estimated action (ACTION), a value of the type attribute (ANNOTATION_TYPE) of the annotation element, a value of the value attribute (VALUE), a value of INTENTION attribute, a value of the semantic class (class) attribute (SEMANTIC_CLASS) of the "SPAN" tag included in the annotation element, and so on. Each action can be specified by the value of the type attribute of the annotation element, the value of the value attribute, the value of the INTENTION attribute, and the value of the semantic class (class) attribute of the "SPAN" tag contained in the annotation element. For example, the action selection knowledge information shown in FIG. 22(*a*) indicates that the action for the annotation element is an action for making a value of the SPAN element that the semantic class is "DATE" into a schedule addition, when the SPAN element that the semantic class is "DATE" is included in the annotation element that the INTENTION attribute is "schedule addition".

Figure 23:
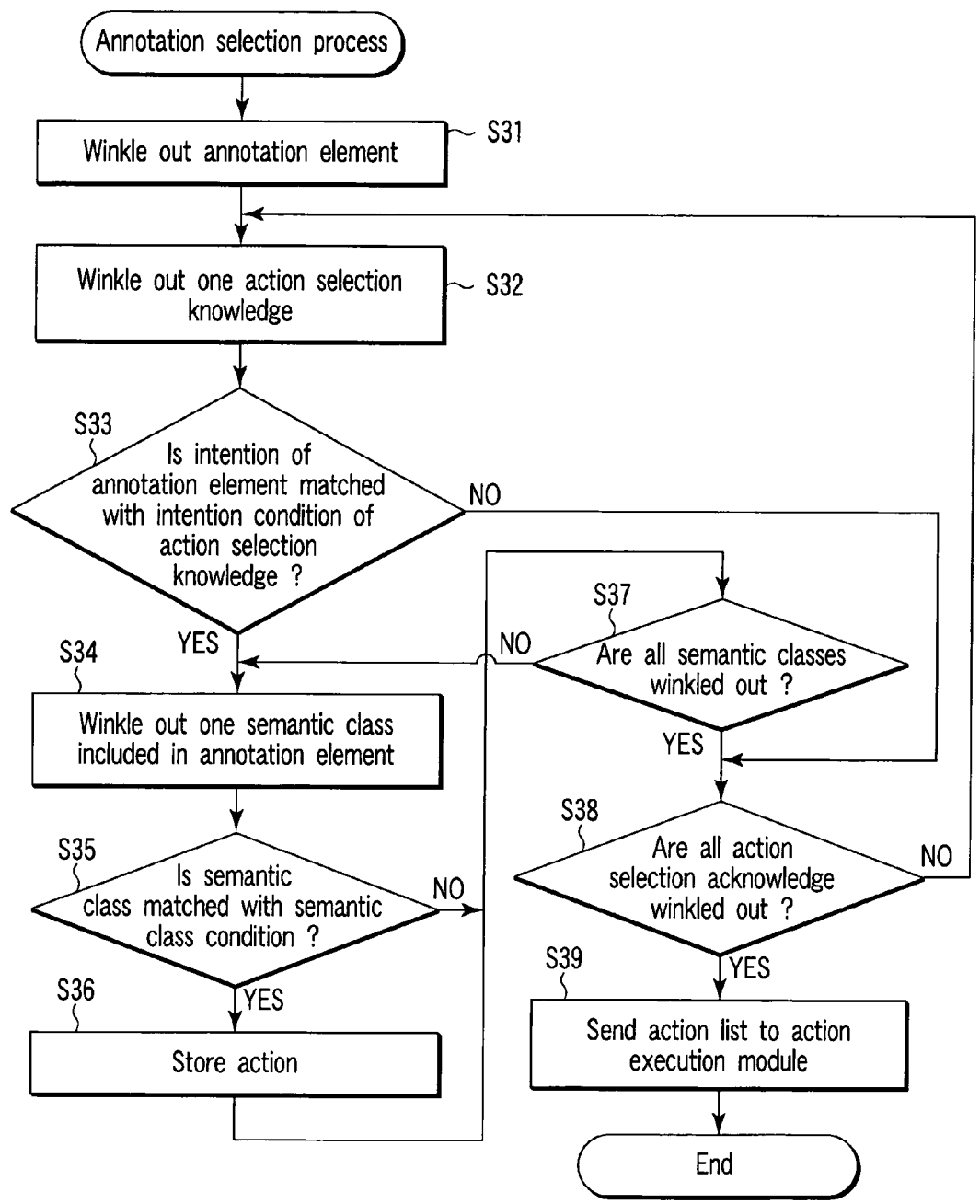
FIG. 23 is flowchart to explain a process operation of an action selection unit.

FIG. 23 is flowchart for explaining a process operation of the action selection unit 109. When receiving document information output from the intention estimation unit 107 and including intention estimation results shown in FIGS. 19 to 21, the action selection unit 109 performs a process shown in FIG. 23 for each annotation element included in the document information. When the annotation element is extracted (step S31), action selection knowledge information is extracted from the action selection knowledge memory 108 (step S32).

When the value of the INTENTION attribute of the annotation element coincides with a value of the "INTENTION" item of the action selection knowledge information (alternatively one of a plurality of values in the case of a condition that it has only to coincide with one of the plurality of values) (step S33), the process advances to step S34. In step S34, the semantic class (value of the class attribute) of one of the SPAN element contained in the annotation element is extracted. When this extracted semantic class matches a semantic class designated by the "SEMAN TIC_CLASS" term of the intention estimation knowledge information or one of a plurality of semantic classes (Yes in step S23), the value described in the "ACTION" item of the action selection knowledge information is temporarily stored (step S36).

In the action selection knowledge information, the type attribute, value attribute of the annotation element, and so on are designated. However, in this case, in step S33, the type attribute, value attribute and so on other than the INTENTION attribute of the annotation are collated with the action selection knowledge information.

The process of steps S34 to S36 is carried out for semantic classes of all SPAN elements included in the annotation element (step S37). In this time, in step S35, when each semantic class of a plurality of SPAN elements contained in the annotation element matches a semantic class specified by the item of "SEMANTIC_CLASS" of the intention estimation knowledge information, the value described in the item of "ACTION" of the action selection knowledge information is stored in postscript in each case. The process of steps S32 to S37 is repeated for all action selection knowledge information stored in the action selection knowledge memory 108 (step S38).

When collation of the annotation element with all action selection knowledge information (steps S32 to step S37) is finished (step S38), a list of the value of the "ACTION" item in the action selection knowledge information provided for the annotation element (stored temporally in step S36) is output (step S39). Actions selected for the annotation element are enumerated in the list. The action selection unit 109 sends the list to the action execution unit 110 (step S39).

For example, in the case of the annotation element of FIG. 19, the value of the INTENTION attribute of the intention estimation result is "schedule addition" and the annotation element include a SPAN element that the semantic class is "DATE". Accordingly, this matches the action selection knowledge information of FIG. 22(a). The value such as "add_schedule (<SPAN class="DATE">, <body>)" described in this "ACTION" item is sent to action execution unit 110.

The value of the "ACTION" item of the action selection knowledge information may be a script and the like describing in text, for example, a command or a routine making a computer execute.

The action execution unit 110 executes an action selected with the action selection unit 109. The mechanism that the action execution unit 110 executes an action is realized by existing script language execution environment.

Assume that the script of "add_schedule (<SPAN class="DATE">, <body>)" corresponding to the value of the "ACTION item of the action selection knowledge of FIG. 22(a) is send.

Assume that there is defined a process that the function of the script of "add_schedule (the first argument, the second argument)" correlates date designated to the first argument with information designated to the second argument with respect to, for example, a scheduling management application. When this script is executed, in the case that the user makes a date appear underlined (in the case that the annotation 401 that the type is "underline" is input), addition of a reading document to a schedule of this date as link information is realized.

Similarly, in the case of the annotation element of FIG. 20, the value of the "ACTION" item, namely the script of "add_database (<ANNOTATION>)" is input to the action execution unit 110 to adapt to the action selection knowledge information of FIG. 22(b). Assume that a function of the script of "add_database (argument)" defines a process of registering information given to the argument in a database and indexing it. When this script is executed with the action execution unit 110, in the case that the user surrounds information including a semantic class of "number", "capacity", "frequency", "size", "length" and so on (in the case that the annotation 402 whose type is "box" is input), registration of information contained in the box to the database is realized.

In the case of the annotation element of FIG. 20, the value of the "ACTION" item, namely a script of "search_www (<ANNOTATION>)" is input to the action execution unit 110 to adapt to the action selection know ledge information of FIG. 22(c). Assume that a function of a script of "search_www" (argument) defines a process of executing Internet search using, as a search word, information given to, for example, the argument. When this script is executed with the action execution unit 110, in the case that the user inserts a question mark in a word of a semantic class such as "title" or "indefinite" (in the case that annotation 403 that the type is "note" and "?" is input), searching Internet using the inserted word as a search key is realized.

The action selection knowledge information shown in FIG. 22(d) indicates that when the INTENTION attribute of the annotation element is "search" and the annotation element includes at least one of SPAN elements of the semantic class of any of "COMPANY" (company name), "PERSON" (person's name), "PRODUCT" (product name) and "COUNTRY" (the name of country), a script of "search_db (<ANNOTATION>, <body>)" is input to the action execution unit 110".

The function of the script of "search_db (the first argument, the second argument)" defines a process for searching a local database by assuming information given to the first argument as search word and a word contained in the second argument as a condition of OR. When this script is executed with the action execution unit 110, in the case that the user writes a question mark in semantic words such as "COMPANY", "PERSON", "PRODUCT", "COUNTRY", it is implemented to search the database using the written-in word as a search key.

In this way, according to the first embodiment, an annotation of at least one of an underline, a box, a character, a character string, a symbol and a symbol string is input to a desired point (coverage of an annotation) of a displayed document with the annotation input unit 120 (marking is done). Alternatively, the annotation is input and the coverage of the annotation is designated.

The annotation unit 105 recognizes the type of the input annotation and the coverage of the annotation. The intention estimation unit 107 estimates the intention of the user based on various information such as type of the annotation and the coverage of the annotation in the document. The action selection unit 109 selects an action for the document based on this estimated intention. The action execution unit 110 executes the selected action. As a result, if the user simply performs a natural operation such as underlining, rounding, and writing-in of a character and a symbol a process (action) along intention of the user can be executed for desired information contained in the document.

Because electronic information can be processed by an operation similar to the operation done with a printed paper sheet and a pen conventionally, the user does not have to learn a special operating instruction. Because an appropriate operation is done by information and contents written-in by the user, the user does not need to instruct an operation procedure to a system or can save labor.

The second and third embodiments show an example of a concrete process operation of the information processing apparatus related to the first embodiment.

Second Embodiment

There will be described a process operation of the information processing apparatus of FIG. 1 for concreteness, using as an example a case to make out the schedule for a meeting by an E-mail.

At first an organizer of the meeting makes a list of E-mail addresses of members (for example, three members of Sato, Saito, Okada) summoned in the meeting in an E-mail. This is made using an address book of a mailer, a LDAP application and the like.

The organizer makes a document shown in FIG. 24, which includes a candidate time-of-day of conferencing, a schedule location, an agenda, an item to be prepared, a reply time limit, a mail title, greetings sentence, concluding remarks, and signature.

Figure 25:
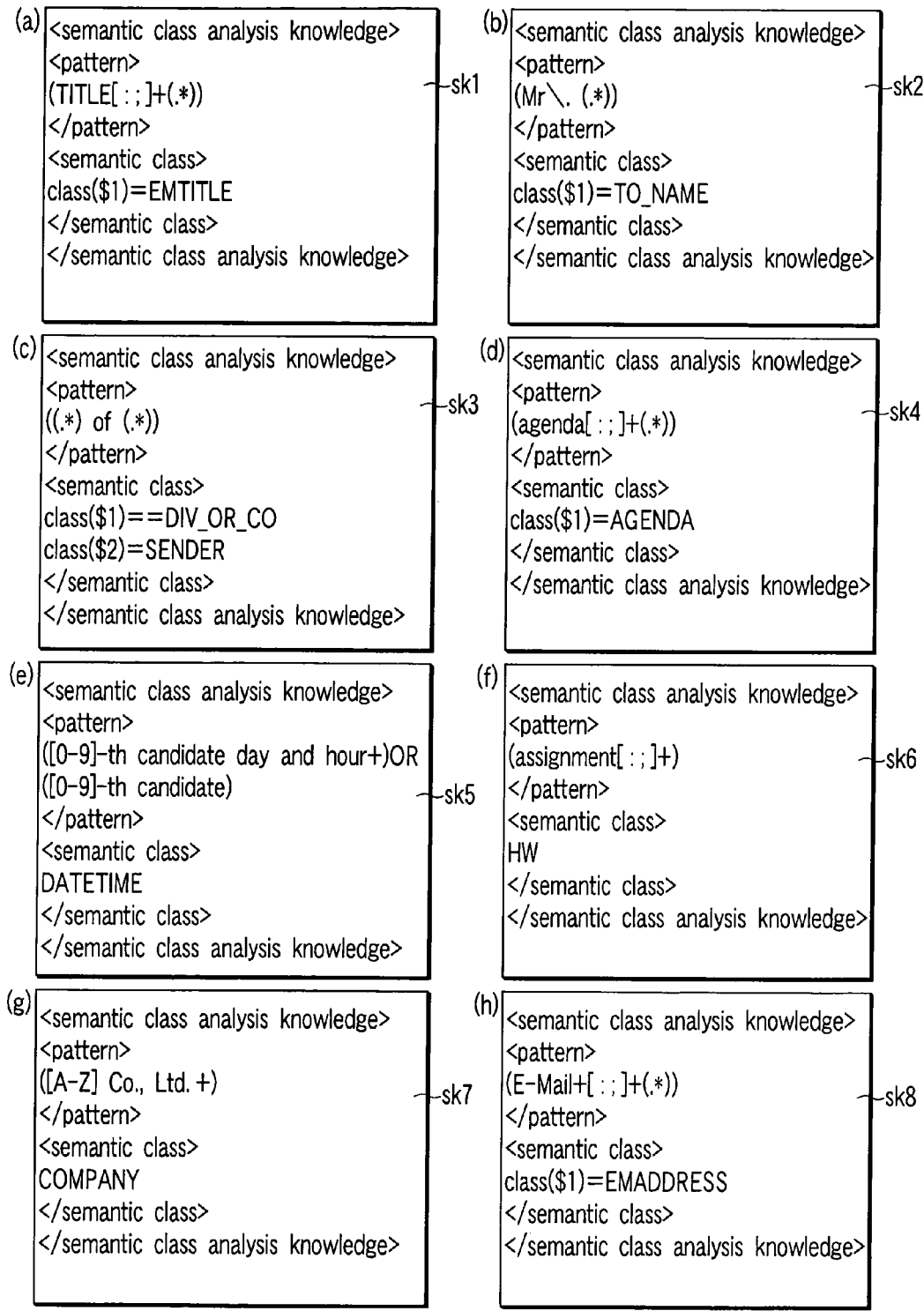
FIG. 25 is a diagram illustrating an example of semantic class analysis knowledge information applied to a document of FIG. 24.

When being supplied with the document shown in FIG. 24, the document information input unit 101 sends it to the semantic class analyzer 103. FIG. 25 shows semantic class analysis knowledge information sk1 to sk8 applied to the document of FIG. 24.

The semantic class analyzer 103 obtains a character string matching a pattern of each semantic class analysis knowledge information stored in the semantic class analysis knowledge memory 102 from the document of FIG. 24 as indicated in the flowchart of FIG. 4, surround this with analysis result tags, namely SPAN tags, and outputs the semantic class analysis result as shown in FIG. 26.

In FIG. 26, the SPAN tag st1 having the semantic class "EMTITLE" is given to the character string matching the pattern of the semantic class analysis knowledge information sk1. The SPAN tag st2 having the semantic class "TO_NAME" is given to the character string matching the pattern of the semantic class analysis knowledge information sk2.

The SPAN tag st3 having the semantic class "DIV_OR_CO", the SPAN tag st4 having the semantic class "SENDER", AND the SPAN tag st9 having the semantic class "DIV_OR_CO" are given to the character string matching the pattern of the semantic class analysis knowledge information sk3.

The SPAN tag st5 having the semantic class "AGENDA" is given to the character string matching the pattern of the semantic class analysis knowledge information sk4. The SPAN tag st6 having the semantic class "DATETIME" is given to the character string matching the pattern of the semantic class analysis knowledge information sk5. The SPAN tag st7 having the semantic class "HW" is given to the character string matching the pattern of the semantic class analysis knowledge information sk6.

The SPAN tag st8 having the semantic class "COMPANY" is given to the character string matching the pattern of the semantic class analysis knowledge information sk7. The SPAN tag st19 having the semantic class "EMADDRESS" is given to the character string matching the pattern of the semantic class analysis knowledge information sk8.

In the semantic class analysis knowledge information sk2 of FIG. 25 may be buried a script as shown in FIG. 27. In other words, when expression of a pattern such as "Mr. ○○" appears in a given document in succession, the script to do a repetitive operation is buried in the semantic class analysis knowledge information sk2 to give a SPAN tag having the semantic class "TO_NAME" to each expression in succession. As a result, the SPAN tag having the semantic class "TO_NAME" can be given to each of continuous expressions by once a collation between this semantic class analysis knowledge information sk2 and the document.

A document including the semantic class analysis result shown in FIG. 26 is provided with the display unit 104 to the user. In this time, the provided semantic class may be or need not be displayed as explained in the first embodiment.

The user inputs, to the display screen on which a document including a semantic class analysis result is displayed, an annotation 501 of "T" with a pen as shown in FIG. 28. The annotation input unit 120 acquires geometry information of the pen-input annotation. This geometry information includes, for example, a vector representing a direction and length of a line of a hand-written character or a vector representing a special feature of a character.

When the annotation of the type such as "note" is input, the annotation may be input after the user indicated explicitly the coverage of the annotation. For example, in FIG. 28, the user designates a range of a region 502 of a document on the display screen. Thereafter, the annotation 501 of "T" is written in the region 502. It is possible to exclude false recognition of a semantic class as much as possible by designating explicitly coverage.

When acquiring information (a coordinate of start and end points of the annotation 501, a length of a path, etc.) on the annotation 501 input with the annotation input unit 120, the annotation unit 105 determine the type of the information as indicated in the flowchart of FIG. 13.

Because the "note" is determined by a coordinate of the start and end points of the annotation 501 and a length of the path thereof, a character recognition of annotation 501 is done using a well-known character recognition technique as explained in the first embodiment. In other words, a template of maximum similarity is acquired by collating the annotation 501 determined as the "note" with each template stored in the annotation template memory 121. Because the similarity between the template of "T" and the annotation 501 become maximum, the type of note of the annotation 501 is determined to be "T".

There will be explained a method of collating an annotation with a template. With the assumption that a set of a template stored in the annotation template memory 121 is T, each feature vector of i pieces of each template j is Cij, and each feature vector of i pieces of the input annotation is Di, the annotation unit 105 obtains a similarity S between the input annotation and each template by the following equation (1).

$$s = \underset{j \in T}{\arg\min} \sum_i (D_i - C_{ij})^2 \qquad (1)$$

The equation (1) means that the template j that square of an error between values of i feature vectors becomes smallest is selected as a template resembling the annotation most. The calculation technique of similarity may use an image recognition, and a minimal length method, a cross correlation method and a Fourier phase correlation method, etc., which are used in pattern recognition broadly, and may use other pattern recognition techniques.

As describe above, the type of the annotation input from the annotation input unit 120 is determined to be "T". At the time of this determination, when the type of the annotation is "note", the type of the annotation is determined along with the type of "note".

The annotation unit 105 determines, from a coordinate of the start and end points of the annotation on a display screen and a length of the path thereof, that the annotation is input to which part of the document information displayed on the display screen, that is, determines the coverage of the annotation in the document text. Alternatively, the annotation unit 105 inserts "ANNOTATION" tags in the beginning and trailing ends of the coverage, respectively, based on the coordinate value of the coverage (region 502 of FIG. 28) of the annotation indicated explicitly by the user on the display screen. When the type of this annotation is determined, the type attribute of the "ANNOTATION" tag becomes "note", and the value attribute becomes "T".

FIG. 29 shows an example of a document including a recognition result of the annotation output from the annotation unit 105. The annotation element having the type attribute and value attribute is included in the document shown in FIG. 29.

The intention estimation unit 107 estimates the intention of the user for the annotation element surrounded with "ANNOTATION" tags in the document information, using the intention estimation knowledge information as shown in FIG. 18.

The type attribute of the annotation element is "note", and the value attribute thereof is "T". The SPAN element that the semantic class is "TO_NAME" and "DATETIME" is included in the annotation element. Accordingly, because this annotation element matches the intention estimation knowledge information as shown in FIG. 30, the intention estimation unit 107 determines that the intention of the user for the annotation element is "schedule tabulation" described in the "INTENTION" item of the intention estimation knowledge information of FIG. 30.

The "schedule tabulation" of the intention estimation result is described as the INTENTION attribute of the annotation element. The action selection unit 109 selects an action with respect to the annotation element including the intention estimation result, using the action selection knowledge information as indicated in FIG. 23.

The INTENTION attribute of the annotation element is "schedule tabulation", and the annotation element includes a SPAN element of the semantic classes of "TO_NAME" and "DATETIME". Accordingly, because the annotation element matches the action selection knowledge information shown in FIG. 31(a), the action selection unit 109 sends the value described in the "ACTION" item of the action selection knowledge information of FIG. 31(a) to the action execution unit 110.

Figure 31:
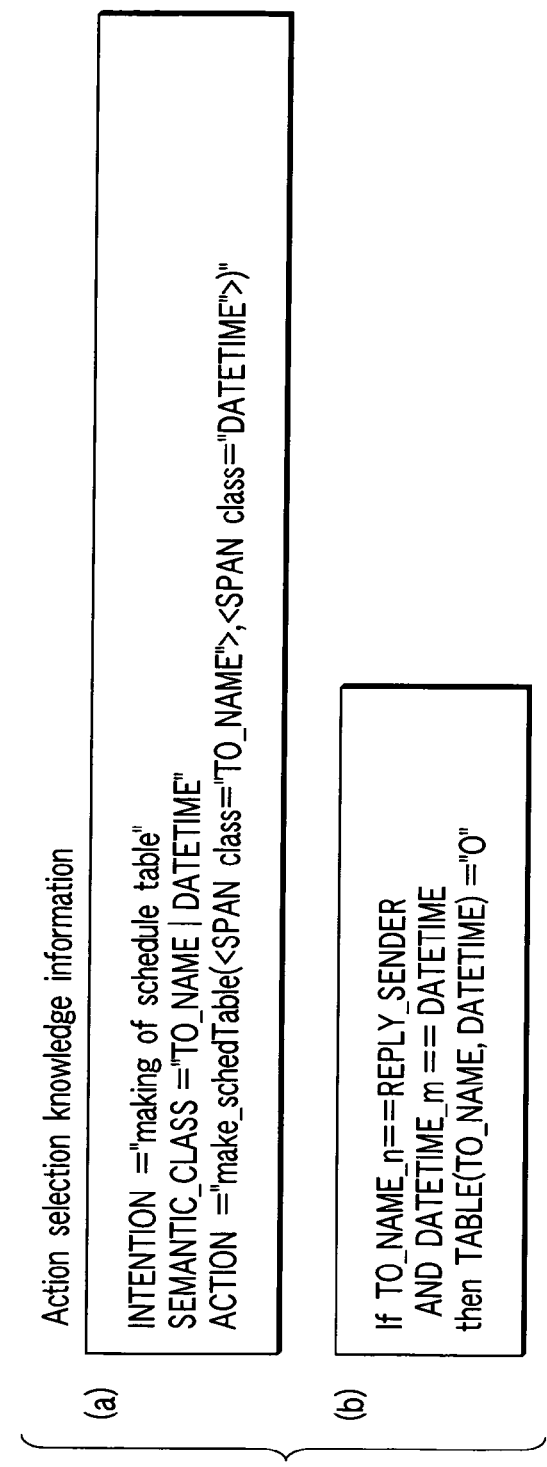
FIG. 31 is a diagram illustrating an example of action selection knowledge information.

The value of the "ACTION" item of the action selection knowledge information of FIG. 31(a) is a script "make_schedTable (<SPANclass="TO_NAME">, <SPANclass="DA TE TI ME">)" for making a schedule table by arranging a value of each SPAN element having a semantic class of "TO_NAME" in item of row and a value of each SPAN element having a semantic class of "DATETIME" in item of column.

In the action of this "make_schedTable" is included a script (second script) for writing "◯" in a cell corresponding to a convenient time-of-day of the member described by the reply mail on the schedule table as shown in FIG. 31(b), based on a reply mail from each member of destination of the mail shown in FIG. 24, other than a script (first script) for making the schedule list.

The action execution unit 110 executes the action "make_schedTable (<SPANclass= TO_NAME">, <SPANclass="DA TE TI ME">)" selected with the action selection unit 109. In other words, the action execution unit 110 sends this action to a module implemented as plug-in software of an E-mail. As a result, the first script for the document shown in FIG. 29 is executed to make a schedule list as shown in FIG. 32, and displayed on the display unit 104.

The values of the SPAN elements each having a semantic class of "TO_NAME" in the annotation element shown in FIG. 29, namely "Sato", "Saito", "Okada" are arranged in the items of rows of a schedule table shown in FIG. 32. In the items of rows are arranged the values of SPAN elements each having a semantic class of "DATETIME" in the annotation element shown in FIG. 29, that is, "first candidate time-of-day: 2004.07.0713:30-15:30" and "the second candidate time-of-day: 2004.07.0810:00-12:00".

The procedure for executing an action for making the schedule table shown in FIG. 32 needs not always accord to the above procedure. There will be explained another procedure for executing an action for making the schedule table shown in FIG. 32.

A document including the semantic class analysis result of the semantic class analyzer 103 is displayed on the display unit 104 along with the semantic class analysis result. In other words, the "SPAN" tag and semantic class attribute are displayed, too. When an annotation is input with the annotation input unit 120, at first, the part (region 503 of FIG. 33) to be disposed in the item of each row of the schedule table is surrounded with a box using a pen as shown in FIG. 33.

The part (region 504 of FIG. 33) to be arranged in the item of each row of a schedule table is surrounded with a box using a pen. Thereafter, similarly, the annotation 501 of "T" is input.

In this case, the annotation unit 105 inserts the "ANNOTATION" tags including a recognition result of an annotation in the beginning and ending parts of the region including regions 503 and 504 as shown in FIG. 34, and further holds each region information in the document specified by the user. Tags each having an attribute indicating a specified order may be inserted in the beginning and trailing parts of each region in a document designated by a user.

The action execution unit 110 executes a script described as a value of the "ACTION" item of the action selection knowledge information via the processes of the intention estimation unit 107 and action selection unit 109 to arrange a value of each SPAN element in a region designated at first in the item of each row of the schedule table and to arrange a value of each SPAN element in a region designated subsequently in the item of each column of the schedule table, thereby to make a schedule table as shown in FIG. 32.

There will be described an operation of a system when, after a mail of the description shown in FIG. 28 is transmitted to each member, an organizer receives an E-mail about an attendance from each member of destination of the mail.

When the schedule table as shown in FIG. 32 is made by the action execution unit 110, for example, an "ACTIVE" mark is displayed on the upper left of the schedule table as shown in FIG. 35. In the state (active state) that this "ACTIVE" mark is displayed, the contents of the reply mail is taken in from the document information input unit 101 automatically, and be written in the schedule table.

When the "ACTIVE" mark is double-clicked, the process to write the reply mail in the schedule table can be stopped. When the organizer receives a reply mail from a certain member, the document information input unit 101 takes in the reply mail.

The semantic class analyzer 103 inserts a "SPAN" tag having a semantic class attribute in the reply mail by using the semantic class analysis knowledge information of the semantic class analysis knowledge memory 102, as shown in flowchart of FIG. 4. FIG. 36 shows an example of a reply mail (in which a "SPAN" tag having a semantic class attribute is inserted) including a semantic analysis result output from the semantic class analyzer 103. FIG. 37 shows the semantic class analysis knowledge information sk9 to sk11 applied to the document of FIG. 36.

As shown in FIG. 36, "SPAN" tags st11, st12 and st13, st16 having respective semantic classes are given respectively to character strings that matches patterns such as semantic class analysis knowledge information sk1, sk3, sk5 of FIG. 25, respectively. In FIG. 36, "Re" is posted to the "TITLE" of the reply mail. Since a character string of "Sato" on the fourth row and a character string of "the second development section" having the semantic class "DIV_OR_CO" match a pattern of the semantic class analysis knowledge information sk9 of FIG. 37, the SPAN tag st15 having the semantic class "REPLY_SENDER" is given to a character string of "Sato" on the fourth row.

Similarly, since a character string of "Tanaka" of the second row matches a pattern of the semantic class analysis knowledge information sk1, the SPAN tag st13 having the semantic class "SENDER" is given. Since a character string of "the second candidate" of the second row matches a pattern of the semantic class analysis knowledge information sk5, the SPAN tag st16 having the semantic class "DATETIME" is given. Subsequently a character string of "ALL RIGHT" follows the SPAN tag. Because the SPAN element of the semantic class "DATETIME" is quoted in the fifth row and the sixth row, a character string that "the second candidate is good"

matches a pattern of the semantic class analysis knowledge information sk11 of FIG. 37. Accordingly the SPAN tag st17 having the semantic class "PLAN" is given.

If it is difficult for a reply person to describe "the second candidate" precisely, when a part surrounded with the DATETIME tag of the sixth row of FIG. 36, for example, is clicked, "the second candidate" may be written in the tenth row automatically.

A script "table (REPLY_SENDER, PLAN)" for executing an action for a character string matching a pattern of the semantic class analysis knowledge information sk11 and having the semantic class "PLAN" is included in the semantic class analysis knowledge information sk11 as shown in FIG. 37(c). Accordingly, this script is added to the SPAN element having the semantic class "PLAN". Alternatively, the script may be added as an attribute of the SPAN element.

The reply mail including such semantic class analysis result as to shown in FIG. 36 is provided to the user by means of the display unit 104. In this case, the provided semantic class may be displayed or need not be displayed as explained in the first embodiment.

When a schedule table made previously becomes an active state, that is, when the "ACTIVE" mark is displayed on the upper left of the schedule table as shown in FIG. 35, and further when the SPAN element of the semantic class "PLAN" is included in the reply mail, the reply mail including the semantic class analysis result shown in FIG. 36 is send to the action execution unit 110 as it is.

In the action execution unit 110, the second script included in the action of "make_schedTable" selected with the action selection unit 109 previously as shown in FIG. 31(b) stands by while the schedule table becomes an active state.

On the other hand, the script "table (REPLY_SENDER, PLAN)" is added to the SPAN element having the semantic class of "PLAN" of the reply mail including the semantic class analysis result of FIG. 36. Under such a condition, the action execution unit 110 at first executes a script added to the SPAN element having the semantic class of "PLAN" in the reply mail. The SPAN element of the semantic class of "REPLY_SENDER" from the reply mail of FIG. 36 and the SPAN element of the semantic class of "PLAN" is extracted by executing this script.

The second script standing by at present as shown in FIG. 31(b) is executed. By executing this the second script, at first the value of the SPAN element of the semantic class "DATETIME" ("Sato" in the case of the reply mail of FIG. 36) is extracted further from the SPAN element of the semantic class "PLAN" extracted previously.

A row of the item matching the extracted value of the SPAN element of the semantic class "DATETIME" is selected from the item (one or more TO_NAME_TO_NAME_n) of each row of the schedule table of FIG. 35. However, even if the value of the SPAN element of DATETIME is abbreviated as "the X-th candidate", the matching assumes to be attained. Of the items (from DATETIME_1 to DATETIME_m) of each row of the schedule table of FIG. 35 is selected a row of a item matching the value ("the second candidate" in the case of the reply mail of FIG. 36) of the SPAN element of the semantic class "REPLY_SENDER" extracted previously.

"◯" is written in a cell specified by the selected row and column of the schedule table of FIG. 35. The schedule table that "◯" is written in as shown in FIG. 38 is displayed on the display unit 104.

When the SPAN element of the semantic class of "PLAN" is recognized by a reply mail as described above whenever the reply mail is received from each member, "◯" is written in the corresponding cell of the schedule table. The schedule table as shown in FIG. 39 is finally completed. When a schedule table as shown in FIG. 39 is displayed on the display unit 104, the user can understand easily the time schedule that all the members can participate in the meeting from this schedule table. In this case, it is Jul. 8, 2004 from 10:00 to 12:00 of the second candidate time-of-day that three members of Sato, Saito, Okada can participate in the meeting.

The second embodiment can utilize for creation and administration of a participant list for a party, a trip, or various projects as well as a meeting.

In the second embodiment, when the candidate date which can participate in a meeting is described in the reply mail, the semantic class analyzer 103 extracts this described candidate date as a SPAN element of the semantic class "PLAN", using the semantic class analysis knowledge information skill (refer to FIG. 37) having a pattern for extracting the candidate time-of-day that can participate in a meeting from each reply mail, and writes "◯" in the schedule table. Without limiting to this case, when a candidate time-of-day on which a member cannot participate in a meeting or "nonattendance" is described, by adding a pattern for extracting a candidate time-of-day on which a member cannot participate a meeting or nonattendance, to the class analysis knowledge information sk11, for example, or using another semantic class analysis knowledge information having such a pattern, this description may be extracted as a SPAN element of the semantic class "PLAN" (alternatively may be another semantic class), and a script for writing "◯" in the schedule table may be added to the corresponding action "make_schedTable".

Third Embodiment

The process operation of the information processing apparatus of FIG. 1 will be described for concreteness using as an example a case to make an address book by means of an E-mail.

A full name, position, an electric-mail address of the partner who exchanges the E-mail are important information regardless of a work or a private. In many mails, these information are written as a signature in a mass on the end of the E-mail. The information processing apparatus of the third embodiment makes it possible to extract information such as a full name, a position, an electric-mail address written in the contents of an E-mail and create an address book automatically.

At first, a schema of the address book as shown in FIG. 40 is prepared. This may use a schema usually performed by the E-mail or the application of the address book as it is. Assume that the address book includes five kinds of information: a name, an electric-mail address, a position, TEL and FAX. Assume that the E-mail as shown in FIG. 41, for example, has been sent to a user.

The document information input unit 101 receives this E-mail (referred to as a document). As shown in flowchart of FIG. 4, a character string matching a pattern of each semantic class analysis knowledge information stored in the semantic class analysis knowledge memory 102 is acquired from a document. The character string is surrounded with analysis result tags, namely SPAN tags to output a semantic class analysis result as shown in FIG. 45. When subjecting the document of FIG. 41 to semantic class analysis, the semantic class analyzer 103 uses the semantic class analysis knowledge information as shown in FIGS. 43 and 44.

The semantic class analysis knowledge information shown in FIG. 44 is the expanded semantic class analysis knowledge information. In the expanded semantic class analysis knowledge information, the pattern included in the normal semantic class analysis knowledge information is expanded with a logical operator and so on, and a program for searching for a character string of an identical pattern is included, and besides, a condition description part other than a pattern is included.

A process operation of the semantic class analyzer 103 is described with reference to FIGS. 42 and 45. FIG. 42 shows a semantic class analysis result using the semantic class analysis knowledge information shown in FIG. 43. FIG. 45 shows the semantic class analysis result of FIG. 42 and a result obtained by performing a semantic class analysis using the expanded semantic class analysis information of FIG. 44.

Figure 43:
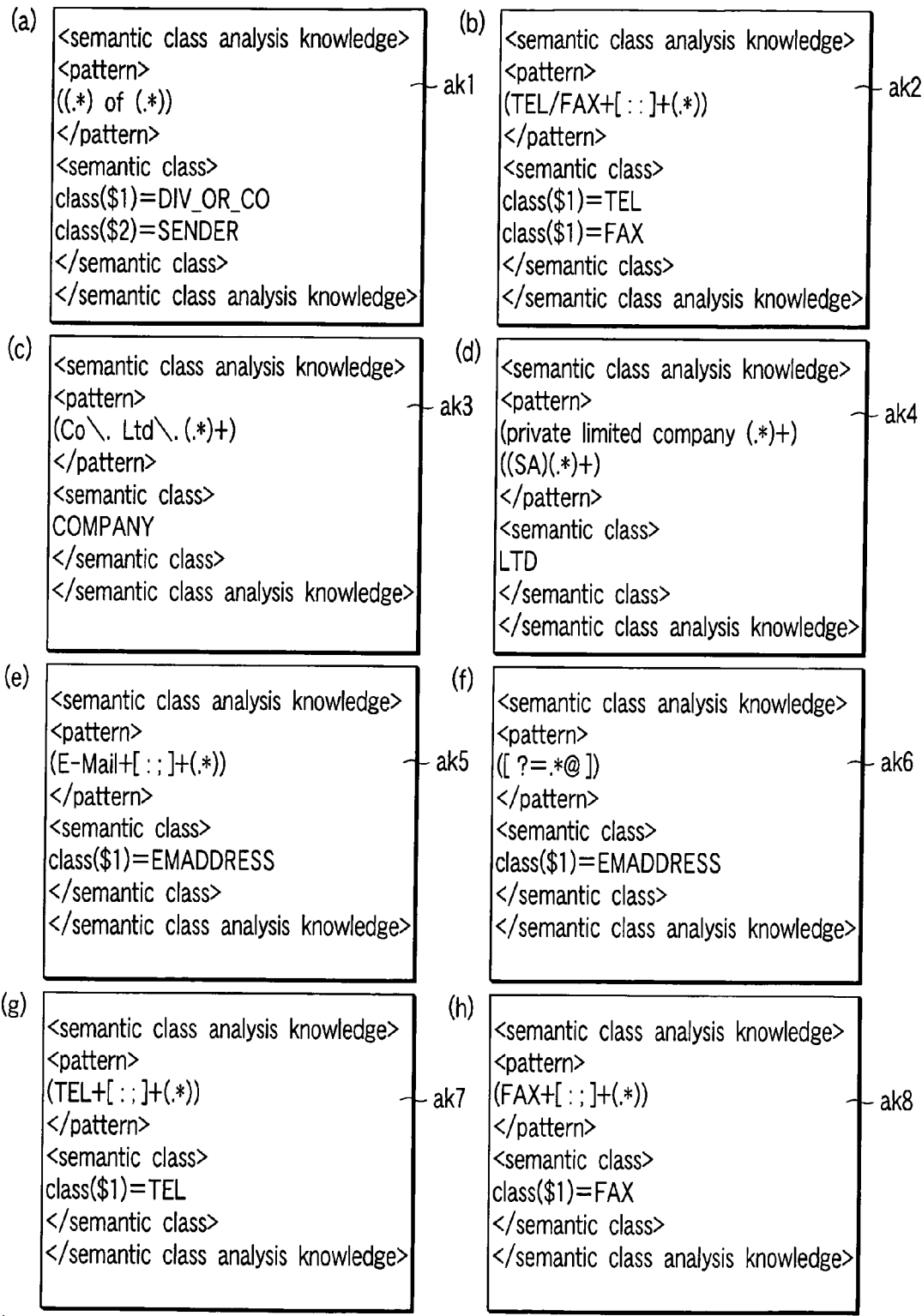
FIG. 43 is a diagram illustrating an example of semantic class analysis knowledge information used in a semantic class analyzer.

The semantic class analyzer 103 generates SPAN elements at1, at2, at6 of FIG. 42 using the semantic class analysis knowledge information ak1 of FIG. 43. Similarly, the semantic class analyzer 103 generates a SPAN element at3 of FIG. 42 using the semantic class analysis knowledge information ak3 of FIG. 43, a SPAN element at5 of FIG. 42 using the semantic class analysis knowledge information ak5 and ak6 of FIG. 43, and SPAN elements at7 and at8 of FIG. 42 using the semantic class analysis knowledge information ak7, ak8 and ak2 of FIG. 43.

The semantic class analyzer 103 subjects the semantic class analysis result of FIG. 42 to a semantic class analysis, using the expanded semantic class analysis knowledge information of FIG. 44. At first, the part of the document of FIG. 42 in which SPAN elements at3-at8 are included matches a pattern specified by the semantic class analysis knowledge information ak11. Therefore, the SPAN element at9 of the semantic class "SIGNATURE" of FIG. 45 is generated. Similarly, the SPAN element at11 of the semantic class "FULLNAME" of FIG. 45 is generated using the semantic class analysis knowledge information ak9, and the SPAN element at10 of the semantic class "AFFILIATION" of FIG. 45 is generated using the semantic class analysis knowledge information ak10.

In the document shown in FIG. 45, the SPAN element at9 includes a full name (semantic class "SENDER") and electric-mail address (semantic class "EMADDRESS") of the sender together. Further, the part in which a company name (semantic class "COMPANY"), a department name (semantic class "DIV_OR_CO"), a telephone number (semantic class "TEL"), a FAX number (semantic class "FAX") and so on are included is surrounded with SPAN tags of semantic class "SIGNATURE" as a so-called signature part.

As discussed above, a signature part in a document or a part describing information registered in an address can be extracted using the semantic class analysis knowledge information. When a document including the semantic class analysis result which is output from the semantic class analyzer 103 and shown in FIG. 45 is displayed on the display unit 104, the user inputs an annotation 601 of, for example, "A" (including meaning indicating a registration to an address book) with a pen from the annotation input unit 120 (FIG. 46).

As explained in the first and second embodiments, when acquiring information (a coordinate of the start and end points of the annotation 501, a length of the path, etc.) on the annotation 601 input with the annotation input unit 120, the annotation unit 105 determines the type as indicated in flowchart of FIG. 13.

Because the annotation 601 is determined as "note" by the coordinate of start and end points of the annotation 601, the length of the path, etc., the annotation 601 is subjected to character recognition. In other words, each template stored in the annotation template memory 121 is collated with the annotation 601 determined as "note" to obtain a template of maximum similarity. Since the similarity of a template of "A" with the annotation 601 is maximum, the type of "note" of the annotation 601 is determined as "A".

The annotation unit 105 determines from the coordinate of start and end points of the annotation 601, the length of the path, etc., for example, that the annotation 601 is input for the whole document displayed on a display screen, and inserts "ANNOTATION" tags in the beginning and trailing ends of the document respectively. When the type of this annotation 601 is determined, the type attribute of the "ANNOTATION" tags is assumed to be "note" and the value attribute to be "A".

The intention estimation unit 107 estimates the intention of the user for the annotation element surrounded with the "ANNOTATION" tags in the document, using intention estimation knowledge information as shown in FIG. 18. The type attribute of the annotation element is "note", and the value attribute is "A". In the annotation element are SPAN elements such as semantic classes of "FULLNAME", "EMA DDR ESS", "AFFILIATION", "TEL", "FAX" in the SPAN element of the semantic class "SIGNATURE". Accordingly, because this annotation element matches the intention estimation knowledge information as shown in FIG. 47, the intention estimation unit 107 determines that the intention of the user for the annotation element is "addition to address book" described in the "INTENTION" item of the intention estimation knowledge information of FIG. 47.

The intention estimation knowledge information of FIG. 47 designates that the SPAN element that the semantic class is any one of "FULLNAME", "EMADDRESS", "AFFILIATION", "TEL", "FAX" is included in a range designated by the "WHERE" item, that is, in the SPAN element of the semantic class "SIGNATURE". The "addition to address book" of the intention estimation result is described as an INTENTION attribute of the annotation element.

The action selection unit 109 selects an action with respect to the annotation element including the intention estimation result, using the action selection knowledge information as shown in FIG. 23. The INTENTION attribute of the annotation element is "addition to address book". The annotation element includes the SPAN element of semantic classes such as "FULLNAME", "EMA DDR ESS", "AFFILIATION", "TEL", and "FAX". Accordingly, because the annotation element matches the action selection knowledge information shown in FIG. 48, the action selection unit 109 sends the value described in the "ACTION" item of the action selection knowledge information of FIG. 48 to the action execution unit 110.

In the value of the "ACTION" item of the action selection knowledge information of FIG. 48 are included scripts for adding the value of the SPAN element of semantic classes such as "FULLNAME", "EMADDRESS", "AFFILIATION", "TEL", "FAX" to an address book, that is, "add_AddressBook (<SPANclass=FULLNAME>, <SPANclass="EMADDRESS>, <SPANclass="AFFILIATION>), <SPANclass=TEL">, <SPANclass=FAX">", and a registration rule to the address book as shown in FIG. 49.

The registration rule to the address book of FIG. 49 shows correspondence between a semantic class and each item of the address book, which corresponds to the semantic class, in other words, defines such a rule that the values of the SPAN elements of the semantic classes such as "FULLNAME", "EMADDRESS", "AFFILIATION", "TEL", "FAX" can be registered in a "name" item, "electric-mail address" item, "position" item, "TEL" item, and "FAX" item of the address book, respectively.

The action execution unit 110 executes the action "add_AddressBook" selected with the action selection unit 109. In other words, the action execution unit 110 sends the script to an address book creation program implemented by a plug-in program of the E-mail.

When the program is executed, the value of the SPAN element of each semantic class in the SPAN element of the semantic class "SIGNATURE" corresponding to a signature part in a document is registered in the address book according to the registration rule to the address book as shown in FIG. 50.

When the action execution unit 110 executes the script once, the "ACTIVE" mark is displayed on the upper left of the address book as shown in FIG. 50. The user can instruct to stop automatically the action for adding to the address book by double-clicking this "ACTIVE" mark. In this way, the document is tagged automatically as long as the user does not provide a special stop instruction, and information is added to the address book.

In the above, an example that the signature part of a document or the part describing the information registered in the address are extracted using the semantic class analysis knowledge information is described. A method of extracting a signature part of a document may be a method other than a method of extracting a signature using the semantic class analysis knowledge information as described above. It is possible to extract a signature part or a part reciting information to be registered to the address book by designating a range with a pen. When the semantic class analyzer 103 obtains the semantic class analysis result shown in FIG. 42, using the semantic class analysis knowledge information shown in FIG. 43, the information is displayed on the display unit 104. Then, the semantic class attribute may be displayed, too.

The user surrounds the signature part of the document or the part (region 602) describing information to be registered in the address book as shown in FIG. 51 with the annotation input unit 120. It is possible to prevent an error part from being extracted by designating the signature part or the part reciting information registered to the address book. Subsequently, an annotation 603 of "A" is input. In this case, the annotation unit 105 inserts "ANNOTATION" tags in the beginning and trailing ends of the region 602 of the document that is specified by the user. When type of this annotation 603 is determined, the type attribute and value attribute of the "ANNOTATION" tags are assumed to be "note" and "A", respectively.

The intention estimation unit 107 estimates the intention of the user for the annotation element surrounded with the "ANNOTATION" tags using the intention estimation knowledge information. The subsequent processes are similar to the above. In this way, an action can be executed in more precision by designating explicitly the coverage of the annotation of the document before inputting various annotations.

According to the third embodiment, it is possible to add information to the address book only by inputting annotation to the document with a pen. Document information such as a business card or a receipt which is input with a scanner and the like can be registered in the address book as well as creation of the address book from the mail contents. Providing such a function to the user solves a problem that human information is dispersed and its administration becomes difficult, and serves to perform unify management of the human information.

The first to third embodiments each estimate the intention of the user from the type (type attribute and value attribute) of the annotation input by the user, the coverage of the annotation, the semantic classes belonging to various information of the coverage (the annotation element), etc., using intension estimation knowledge.

In each intention estimation knowledge information, the type of the annotation and the semantic class included in information in the annotation element are specified to estimate the intention of the user. However, when a document described in HTML and XML is intended for estimation of the user intention, it becomes possible to estimate the intention of the user more accurately by designating the sentence element of the document, that is, the element surrounded with arbitrary tags.

When the annotation is collated with intention estimation knowledge information, it is possible to estimate the intention of the user at higher speed, because the search range can be narrowed to the designated range (sentence element). For example, a pertinent part surrounded with tags including the semantic class is not designated as the annotation coverage by designating merely the semantic class included in the annotation element, but the annotation coverage may be designated by designating other tags sandwiching the pertinent part. When a document described in XML is intended for estimation of the user intention, a part structure of the document may be designated by an arbitrary tag or a plurality of arbitrary tags.

FIG. 52 shows an example of intention estimation knowledge information including the "DOCUMENT_STRUCTURE" item designating a sentence element of a document text. The intention imputed knowledge information shown in FIG. 52 indicates that the intention of the user is "schedule addition", when information contained in the annotation element that the type of the annotation is "underline" includes the SPAN element that the semantic class in each paragraph surrounded with tags <P> is "DATE".

In the case that it is examined whether the annotation element in the document text to be intended matches the intention estimation knowledge information of FIG. 52, assume that the type attribute of the annotation element is "underline" and an element surrounded with the tags <p> exists. In this case, the intention estimation unit 107 examines whether the SPAN elements that the semantic class attribute is "DATE" in the element surrounded with the tags <p>.

As shown in FIG. 47, there is intention estimation knowledge information to estimate the intention of the user by designating the semantic class to which each information that is the semantic class analysis result belongs, by the "WHERE" item other than the type of the annotation, and designating a semantic class of information included in information belonging to the semantic class, by the "SEMANTIC_CLASS" item.

As discussed above, according to the first to third embodiments, if the user simply performs a natural operation such as underlining a sentence, surrounding a sentence with a frame, writing in a character or a symbol, it is possible to execute a process (action) along the intention of a user for desired information contained in the document.

The technique of the present invention which is described in the embodiments of the present invention may be stored as a program in a recording medium such as a magnetic disc (a flexible disk, a hard disk, etc.), an optical disc (compact disk-read only memory, DVD), and a semiconductor memory, and distributed. If a program for realizing a function of each of the document information input unit 101, a semantic class analyzer 103, a display unit 104, an annotation unit 105, an intention recognition unit 107, an action selection unit 109, and an action execution unit is stored in a storage unit of a computer, and executed by an arithmetic operation module of the computer, the computer can function as an information processing apparatus concerning the first to third embodiments.

According to the present invention, it is possible to execute a process along intention of a user for desired information included in the document by marking a document by a underline, a box, a character, a symbol, etc.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising:
   an input unit configured to input, by a user, an annotation of at least one of an underline, a box, a character, a character string, a symbol, and a symbol string in a position on a document to be annotated by the user that identifies coverage of a certain portion of the document;
   a display configured to display both the document and the user inputted annotation concurrently on the document;
   a first memory to store a plurality of patterns each expressed in at least one of a character, a character string and a symbol, and for each a semantic class representing a type or meaning of information matching;
   a second memory to store intention estimation knowledge information for estimating an intention of the user organized by type of annotation and related semantic class of information;
   an annotation recognition unit configured to recognize a type of annotation input by the user and a coverage of the annotation in the displayed document;
   a semantic class analyzer to provide a semantic class for information matching a pattern in the coverage of the displayed document identified by the user-inputted annotation;
   an intention estimation unit configured to estimate an intention of the user based on the intention estimation knowledge information determined by the semantic class provided by the semantic class analyzer and the type of recognized annotation, wherein the intention of the user corresponds to an action the user intends to perform;
   an action selection unit configured to select the action intended by the user based on the intention estimated by the intention estimation unit;
   an execution unit configured to execute the action selected by the action selection unit by extracting at least one information item from the displayed document and creating an output including the one information item; and
   a display unit configured to display a view of the output created by the execution unit.

2. The information processing apparatus according to claim 1, further including a character recognition unit configured to subject the input annotation to character recognition.

3. The information processing apparatus according to claim 1, wherein the input unit is configured to input an annotation for creating a schedule table, the intention estimation unit is configured to estimate the intention of the user that creates the schedule table based on the type of the annotation, and the action selection unit is configured to select an action for creating the schedule table from the storage unit based on the estimated intention, and the execution unit is configured to extract information items required for creation of the schedule from the document and arrange the information items on a schedule table.

4. The information processing apparatus according to claim 1, wherein the input unit is configured to input an annotation for creating an address book, the intention estimation unit is configured to estimate the intention of the user that creates the address book based on the type of the annotation, and the action selection unit is configured to select an action for creating the address book from the storage unit based on the estimated intention, and the execution unit is configured to extract information items required for creation of the address book from the document and arrange the information items on an address book.

5. The information processing apparatus according to claim 1, wherein the intention of the user is to search.

6. An information processing method comprising:
   storing, to a first memory, a plurality of patterns each expressed in at least one of a character, a character string and a symbol, and for each a semantic class representing a type or meaning of information matching;
   storing, to a second memory, intention estimation knowledge information for estimating an intention of a user organized by type of annotation and related semantic class of information;
   displaying a document;
   receiving, from the user, an annotation of at least one of an underline, a box, a character, a character string, a symbol, and a symbol string in a position on the displayed document that identifies coverage of a certain portion of the displayed document and concurrently displaying said document and said user-inputted annotation concurrently on said displayed document;
   recognizing a type of the annotation and a coverage of the annotation in the displayed document;
   providing a semantic class for information matching a pattern in the coverage of the displayed document identified by the user-inputted annotation;
   estimating an intention of the user based on the intention estimation knowledge information determined by the semantic class and the type of recognized annotation, wherein the intention of the user corresponds to an action the user intends to perform;
   selecting the action intended by the user based on the estimated intention;
   executing the action selected by extracting at least one information item from the displayed document and creating an output including the one information item; and
   displaying a view of the output created by the execution unit.

7. The method according to claim 6, wherein recognizing the type of the annotation includes recognizing the type of the annotation by a character recognition.

8. The method according to claim 6, wherein inputting the annotation includes inputting an annotation for creating a schedule table, estimating the intention includes estimating the intention of the user that creates the schedule table based on the type of the annotation, and selecting the action includes selecting an action for creating the schedule table from the storage unit based on the estimated intention, and executing the action includes extracting information items required for creation of the schedule table from the document and arranging the information items on the schedule table.

9. The method according to claim 6, wherein inputting the annotation includes inputting an annotation for creating an address book, estimating the intention includes estimating the intention of the user that creates the address book based on the type of the annotation, and selecting the action includes selecting an action for creating the address book from the storage unit based on the estimated intention, and executing the action includes extracting information items required for creation of the address book from the document and arranging the information items on the address book.

10. A computer readable storage medium storing instructions executable by a processor that performs a method, the method comprising:

storing to a first memory a plurality of patterns each expressed in at least one of a character, a character string and a symbol, and for each a semantic class representing a type or meaning of information matching;

storing, to a second memory, intention estimation knowledge information for estimating an intention of a user organized by type of annotation and related semantic class of information;

displaying a document;

received from a user input device an annotation of at least one of an underline, a box, a character, a character string, a symbol, and a symbol string in a position on the displayed document that identifies coverage of a certain portion of the displayed document and concurrently displaying said document and said user-inputted annotation on said displayed document;

recognizing a type of the annotation and a coverage of the annotation in the displayed document;

providing a semantic class for information matching a pattern in the coverage of the displayed document identified by the user-inputted annotation;

estimating an intention of the user based on the intention estimation knowledge information determined by the semantic class and the type of recognized annotation, wherein the intention of the user corresponds to an action the user intends to perform;

selecting the action intended by the user based on the estimated intention;

executing the action selected by extracting at least one information item from the displayed document and creating an output including the one information item; and displaying a view of the output created by the execution unit.

* * * * *